(12) United States Patent
Lee et al.

(10) Patent No.: US 10,548,079 B2
(45) Date of Patent: Jan. 28, 2020

(54) TRACKING REFERENCE SIGNAL FOR NEW RADIO

(71) Applicant: QUALCOMM Incorporated, San Diego, CA (US)

(72) Inventors: Heechoon Lee, San Diego, CA (US);
Yang Yang, San Diego, CA (US);
Tingfang Ji, San Diego, CA (US);
Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 15/888,980

(22) Filed: Feb. 5, 2018

(65) Prior Publication Data
US 2018/0227848 A1   Aug. 9, 2018

Related U.S. Application Data

(60) Provisional application No. 62/455,585, filed on Feb. 6, 2017.

(51) Int. Cl.
*H04W 52/02* (2009.01)
*H04W 72/04* (2009.01)
*H04L 5/00* (2006.01)

(52) U.S. Cl.
CPC ....... *H04W 52/0216* (2013.01); *H04L 5/0051* (2013.01); *H04W 72/0446* (2013.01); *H04L 5/001* (2013.01)

(58) Field of Classification Search
CPC ............. H04W 52/0216; H04L 5/0051; H04L 5/0053; H04L 5/0091
See application file for complete search history.

(56) References Cited

U.S. PATENT DOCUMENTS

2013/0114535 A1   5/2013  Ng et al.
2017/0332359 A1*  11/2017 Tsai ..................... H04B 7/0617
(Continued)

OTHER PUBLICATIONS

International Search Report and Written Opinion—PCT/US2018/017091—ISA/EPO—dated May 16, 2018 (172726WO).
(Continued)

*Primary Examiner* — Wei Zhao
(74) *Attorney, Agent, or Firm* — Holland & Hart LLP

(57) ABSTRACT

Tracking reference signal designs for deployments without continuous reference signal transmission are described. The tracking reference signals may be extended in the frequency domain from a synchronization signal block and may occupy a subset or all of the symbol periods of the synchronization signal block. The tracking reference signals may have the same subcarrier spacing as synchronization signals and may be punctured in the frequency domain. Alternatively, the tracking reference signals may include common control reference signals transmitted periodically with paired reference signals in a data channel. The common control reference signals and paired reference signals may be transmitted regardless of the presence of control or data. For improved tracking after a transition to a connected mode or a long discontinuous reception (DRX) cycle, a slot including tracking reference signals may be repeated or an additional tracking reference signal pattern may be transmitted.

50 Claims, 21 Drawing Sheets

(56) References Cited

U.S. PATENT DOCUMENTS

2017/0366311 A1* 12/2017 Iyer .................. H04B 7/0482
2018/0145819 A1* 5/2018 Axmon .................. H04L 5/16

OTHER PUBLICATIONS

QUALCOMM Incorporated: "Discussion on Tracking RS and RLM", 3GPP Draft; R1-1700811 Discussion on Tracking RS and RLM, 3rd Generation Partnership Project (3GPP), Mobile Competence Centre; 650, Route Des Lucioles; F-06921, Sophia-Antipolis Cedex; France, vol. RAN WG1, No. Spokane, U.S.A.; Jan. 16, 2017-Jan. 20, 2017 Jan. 16, 2017, XP051208330, Retrieved from the Internet: URL:http://www.3gpp.org/ftp/Meetings_3GPP_SYNC/RAN1/Docs/ [retrieved on Jan. 16, 2017], 5 pages.

ETRI: "Discussion on Phase Tracking RS Design", 3GPP Draft; R1-1700579 Discussion on Phase Tracking RS Design, 3rd Generation Partnership Project (3GPP), Mobile Competence Centre; 650, Route Des Lucioles; F-06921, Sophia-Antipolis Cedex; France, vol. RAN WG1, No. Spokane, USA; Jan. 16, 2017-Jan. 20, 2017 Jan. 16, 2017, XP051208108, Retrieved from the Internet: URL:http://www.3gpp.org/ftp/Meetings_3GPP_SYNC/RAN1/Docs/ [retrieved on Jan. 16, 2017], 6 pages.

\* cited by examiner

TRACKING REFERENCE SIGNAL FOR NEW RADIO

CROSS REFERENCES

The present application for patent claims priority to U.S. Provisional Patent Application No. 62/455,585 by LEE, et al., entitled "Tracking Reference Signal For New Radio," filed Feb. 6, 2017, assigned to the assignee hereof.

BACKGROUND

The following relates generally to wireless communication, and more specifically to tracking reference signal (TRS) for New Radio (NR).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or an NR system. A wireless multiple-access communications system may include a number of base stations or access network nodes, each simultaneously supporting communication for multiple communication devices, which may be otherwise known as user equipment (UE).

In some wireless communications systems, base stations may transmit synchronization signals and reference signals over a carrier to assist UEs with cell acquisition as well as frequency and time tracking of the carrier. For example, synchronization signals may allow UEs to detect a cell transmitted over a carrier. Synchronization signals may also allow the UEs to detect the center frequency of the carrier and achieve synchronization at the transmission time interval or symbol level. However, for robust reception and demodulation across a system bandwidth, the UEs may also maintain tracking loops using reference signals that span a larger portion of the system bandwidth.

Some base stations may continuously transmit reference signals such as cell reference signals (CRS) within a subset of resources of each resource block across the system bandwidth. Continuous transmission of reference signals may draw significant power and in some cases may be an unnecessary waste of resources, particularly when no UEs are connected to or tracking timing for a cell associated with the base station. Furthermore, UE power consumption may increase as the relative amount of time that the UE is receiving reference signal transmissions increases. In addition, communication with UEs may experience latency as tracking loops converge. Thus, supporting robust time tracking for cells that intermittently serve UEs may provide challenges in power management at both base stations and UEs.

SUMMARY

The described techniques relate to improved methods, systems, devices, or apparatuses that support tracking reference signal (TRS) for new radio (NR). Generally, the described techniques allow TRSs to be extended in the frequency domain from a synchronization signal block. The TRSs may occupy a subset or all of the symbol periods of the synchronization signal block and may have the same subcarrier spacing as synchronization signals within a synchronization signal blocks. In some cases, the TRSs may be punctured in the frequency domain. Alternatively, the TRSs may include common control reference signals transmitted periodically in a control region within a transmission time interval (TTI) and paired with reference signals transmitted in a data channel. The common control reference signals and paired reference signals may be transmitted regardless of the presence of control or data. In some examples, a TTI including TRSs may be repeated or an additional TRS pattern may be transmitted.

A method of wireless communication is described. The method may include identifying, by a user equipment (UE) in a connected mode with a base station, a set of resources for a tracking reference signal periodically transmitted by the base station in a data region of a first TTI, the tracking reference signal comprising a plurality of sub-patterns for a set of sub-carriers of a carrier for the UE for a set of symbol periods in the first TTI, the plurality of sub-patterns spanning a first portion of a bandwidth of the carrier, receiving the tracking reference signal on the identified set of resources, and performing frequency and time tracking of the carrier based on the received tracking reference signal.

An apparatus for wireless communication is described. The apparatus may include means for identifying, by a UE in a connected mode with a base station, a set of resources for a tracking reference signal periodically transmitted by the base station in a data region of a first TTI, the tracking reference signal comprising a plurality of sub-patterns for a set of sub-carriers of a carrier for the UE for a set of symbol periods in the first TTI, the plurality of sub-patterns spanning a first portion of a bandwidth of the carrier, means for receiving the tracking reference signal on the identified set of resources, and means for performing frequency and time tracking of the carrier based on the received tracking reference signal.

Another apparatus for wireless communication is described. The apparatus may include a processor, memory in electronic communication with the processor, and instructions stored in the memory. The instructions may be operable to cause the processor to identify, by a UE in a connected mode with a base station, a set of resources for a tracking reference signal periodically transmitted by the base station in a data region of a first TTI, the tracking reference signal comprising a plurality of sub-patterns for a set of sub-carriers of a carrier for the UE for a set of symbol periods in the first TTI, the plurality of sub-patterns spanning a first portion of a bandwidth of the carrier, receive the tracking reference signal on the identified set of resources, and perform frequency and time tracking of the carrier based on the received tracking reference signal.

A non-transitory computer-readable medium for wireless communication is described. The non-transitory computer-readable medium may include instructions operable to cause a processor to identify, by a UE in a connected mode with a base station, a set of resources for a tracking reference signal periodically transmitted by the base station in a data region of a first TTI, the tracking reference signal comprising a plurality of sub-patterns for a set of sub-carriers of a carrier for the UE for a set of symbol periods in the first TTI, the plurality of sub-patterns spanning a first portion of a bandwidth of the carrier, receive the tracking reference signal on the identified set of resources, and perform frequency and time tracking of the carrier based on the received tracking reference signal.

Some examples of the method, apparatus, and non-transitory computer-readable medium described above may further include processes, features, means, or instructions for receiving, from the base station, configuration information for the tracking reference signal, the configuration information comprising the first portion of the bandwidth, or a density, or a puncturing pattern, or a subcarrier spacing, or a combination thereof, where the set of resources for the tracking may be determined based on the received configuration information for the tracking reference signal.

In some examples of the method, apparatus, and non-transitory computer-readable medium described above, the plurality of sub-patterns include paired symbol periods transmitted on a same sub-carrier.

In some examples of the method, apparatus, and non-transitory computer-readable medium described above, the first TTI includes a downlink TTI.

In some examples of the method, apparatus, and non-transitory computer-readable medium described above, the plurality of sub-patterns of subcarriers spans all subcarriers within the bandwidth of the carrier.

In some examples of the method, apparatus, and non-transitory computer-readable medium described above, the plurality of sub-patterns may be separated by at least one subcarrier within the first portion of the bandwidth.

In some examples of the method, apparatus, and non-transitory computer-readable medium described above, the tracking reference signal extends across an entirety of the bandwidth of the carrier.

Some examples of the method, apparatus, and non-transitory computer-readable medium described above may further include processes, features, means, or instructions for identifying a plurality of TTIs to receive a supplemental tracking reference signal from the base station based on a timing of a transition of the UE from an idle mode to the connected mode, or a timing of a connected mode discontinuous reception (CDRX) cycle for the UE, or receiving an indicator of at least one of the plurality of TTIs.

Some examples of the method, apparatus, and non-transitory computer-readable medium described above may further include processes, features, means, or instructions for receiving a supplemental tracking reference signal over a plurality of TTIs, the supplemental tracking reference signal comprising a same plurality of sub-patterns as the plurality of sub-patterns of the tracking reference signal periodically transmitted by the base station.

Some examples of the method, apparatus, and non-transitory computer-readable medium described above may further include processes, features, means, or instructions for receiving a supplemental tracking reference signal over a second TTI, the supplemental tracking reference signal comprising a second plurality of sub-patterns for a second set of sub-carriers, the second plurality of sub-patterns spanning at least a portion of the bandwidth of the carrier, and at least one of the second plurality of sub-patterns different from the plurality of sub-patterns of the tracking reference signal periodically transmitted by the base station.

In some examples of the method, apparatus, and non-transitory computer-readable medium described above, a density of the supplemental tracking reference signal in the second TTI may be greater than the density of the tracking reference signal in the first TTI.

Some examples of the method, apparatus, and non-transitory computer-readable medium described above may further include processes, features, means, or instructions for receiving the tracking reference signal over a plurality of TTIs. Some examples of the method, apparatus, and non-transitory computer-readable medium described above may further include processes, features, means, or instructions for performing the frequency and time tracking of the carrier based on identifying that a tracking loop for the tracking reference signal received over the plurality of TTIs may have converged.

Some examples of the method, apparatus, and non-transitory computer-readable medium described above may further include processes, features, means, or instructions for identifying a synchronization block periodically transmitted by the base station, the synchronization block spanning a second portion of the bandwidth of the carrier in the first TTI, the second portion of the bandwidth exclusive of the first portion of the bandwidth. Some examples of the method, apparatus, and non-transitory computer-readable medium described above may further include processes, features, means, or instructions for receiving a plurality of synchronization signals of the synchronization block in the identified set of symbol periods of the first TTI.

In some examples of the method, apparatus, and non-transitory computer-readable medium described above, the synchronization block may be transmitted in at least the set of symbol periods for the tracking reference signal.

Some examples of the method, apparatus, and non-transitory computer-readable medium described above may further include processes, features, means, or instructions for receiving a demodulation reference signal in a control region of the first TTI, the demodulation reference signal mapped to the set of sub-carriers of the first TTI. Some examples of the method, apparatus, and non-transitory computer-readable medium described above may further include processes, features, means, or instructions for identifying the set of sub-carriers for the tracking reference signal based on the set of sub-carriers for the received demodulation reference signal.

A method of wireless communication is described. The method may include determining, by a base station, a set of resources for a tracking reference signal in a data region of a first TTI, the set of resources comprising a plurality of sub-patterns for a set of sub-carriers of a carrier for a UE for a set of symbol periods in the first TTI, the plurality of sub-patterns spanning a first portion of a bandwidth of the carrier and transmitting, periodically by the base station, the tracking reference signal on the determined set of resources in the data region.

An apparatus for wireless communication is described. The apparatus may include means for determining, by a base station, a set of resources for a tracking reference signal in a data region of a first TTI, the set of resources comprising a plurality of sub-patterns for a set of sub-carriers of a carrier for a UE for a set of symbol periods in the first TTI, the plurality of sub-patterns spanning a first portion of a bandwidth of the carrier and means for transmitting, periodically by the base station, the tracking reference signal on the determined set of resources in the data region.

Another apparatus for wireless communication is described. The apparatus may include a processor, memory in electronic communication with the processor, and instructions stored in the memory. The instructions may be operable to cause the processor to determine, by a base station, a set of resources for a tracking reference signal in a data region of a first TTI, the set of resources comprising a plurality of sub-patterns for a set of sub-carriers of a carrier for a UE for a set of symbol periods in the first TTI, the plurality of sub-patterns spanning a first portion of a bandwidth of the carrier and transmit, periodically by the base station, the tracking reference signal on the determined set of resources in the data region.

A non-transitory computer-readable medium for wireless communication is described. The non-transitory computer-readable medium may include instructions operable to cause a processor to determine, by a base station, a set of resources for a tracking reference signal in a data region of a first TTI, the set of resources comprising a plurality of sub-patterns for a set of sub-carriers of a carrier for a UE for a set of symbol periods in the first TTI, the plurality of sub-patterns spanning a first portion of a bandwidth of the carrier and transmit, periodically by the base station, the tracking reference signal on the determined set of resources in the data region.

Some examples of the method, apparatus, and non-transitory computer-readable medium described above may further include processes, features, means, or instructions for transmitting configuration information for the tracking reference signal, the configuration information comprising the first portion of the bandwidth, or a density, or a puncturing pattern, or a subcarrier spacing, or a combination thereof.

In some examples of the method, apparatus, and non-transitory computer-readable medium described above, the plurality of sub-patterns include paired symbol periods transmitted on a same sub-carrier.

In some examples of the method, apparatus, and non-transitory computer-readable medium described above, the first TTI includes a downlink TTI.

In some examples of the method, apparatus, and non-transitory computer-readable medium described above, the plurality of sub-patterns of subcarriers spans all subcarriers within the bandwidth of the carrier.

In some examples of the method, apparatus, and non-transitory computer-readable medium described above, the plurality of sub-patterns may be separated by at least one subcarrier within the first portion of the bandwidth.

In some examples of the method, apparatus, and non-transitory computer-readable medium described above, transmitting the tracking reference signal further includes transmitting the tracking reference signal based on determining that the UE may be in a connected mode.

Some examples of the method, apparatus, and non-transitory computer-readable medium described above may further include processes, features, means, or instructions for determining that the UE may have transitioned from the connected mode with the base station to an idle mode. Some examples of the method, apparatus, and non-transitory computer-readable medium described above may further include processes, features, means, or instructions for suppressing transmission of the tracking reference signal for at least one subsequent TTI based on the determining.

In some examples of the method, apparatus, and non-transitory computer-readable medium described above, transmitting the tracking reference signal includes determining an absence of UEs in a connected mode with the base station. Some examples of the method, apparatus, and non-transitory computer-readable medium described above may further include processes, features, means, or instructions for suppressing transmission of the tracking reference signal based on the determining.

Some examples of the method, apparatus, and non-transitory computer-readable medium described above may further include processes, features, means, or instructions for transmitting a supplemental tracking reference signal over a plurality of TTIs, the supplemental tracking reference signal comprising a same plurality of sub-patterns as the plurality of sub-patterns of the tracking reference signal periodically transmitted by the base station.

Some examples of the method, apparatus, and non-transitory computer-readable medium described above may further include processes, features, means, or instructions for transmitting a supplemental tracking reference signal over a second TTI, the supplemental tracking reference signal comprising a second plurality of sub-patterns for a second set of sub-carriers, the second plurality of sub-patterns spanning at least a portion of the bandwidth of the carrier, and at least one of the second plurality of sub-patterns different from the plurality of sub-patterns of the tracking reference signal periodically transmitted by the base station.

In some examples of the method, apparatus, and non-transitory computer-readable medium described above, a density of the supplemental tracking reference signal in the second TTI may be greater than the density of the tracking reference signal in the first TTI.

Some examples of the method, apparatus, and non-transitory computer-readable medium described above may further include processes, features, means, or instructions for transmitting, periodically by the base station, a synchronization block over a second portion of the bandwidth of the carrier in the first TTI, the second portion of the bandwidth exclusive of the first portion of the bandwidth. Some examples of the method, apparatus, and non-transitory computer-readable medium described above may further include processes, features, means, or instructions for transmitting a plurality of synchronization signals of the synchronization block in the set of symbol periods of the first TTI.

In some examples of the method, apparatus, and non-transitory computer-readable medium described above, the synchronization block may be transmitted in at least the set of symbol periods for the tracking reference signal.

Some examples of the method, apparatus, and non-transitory computer-readable medium described above may further include processes, features, means, or instructions for transmitting a demodulation reference signal in a control region of the first TTI, the demodulation reference signal mapped to the set of sub-carriers of the first TTI. Some examples of the method, apparatus, and non-transitory computer-readable medium described above may further include processes, features, means, or instructions for allocating the set of sub-carriers for the tracking reference signal based on the set of sub-carriers for the transmitted demodulation reference signal.

DETAILED DESCRIPTION

A user equipment (UE) in a wireless communications system, such as a Long Term Evolution (LTE) system or a New Radio (NR) system, may perform time and frequency tracking using reference signals transmitted by a base station. The UE may rely on continuous or periodic transmission of reference signals to obtain fine time and frequency tracking measurements. In some cases (e.g., to reduce the energy spent by a base station), the transmission of some reference signals may be sparse or not periodic (e.g., aperiodic), and thus, a UE may no longer be able to rely on such transmissions for time and frequency tracking.

Thus, in accordance with the present disclosure, tracking reference signals (TRSs) may be transmitted by a base station concurrently with synchronization blocks used for cell acquisition. The TRSs may be transmitted using the same subcarrier spacing as the signals transmitted in the synchronization blocks and in some cases may span the same number of symbols as the synchronization block. Some examples provide puncturing of the TRSs in the frequency domain and may only be transmitted by a base station when a UE is in a connected mode with the base station.

Aspects of the disclosure are initially described in the context of a wireless communications system. Aspects of the disclosure are also described in the context of resource allocation schemes and process flows for wireless communication. Aspects of the disclosure are further illustrated by and described with reference to apparatus diagrams, system diagrams, and flowcharts that relate to TRS for NR.

Figure 1:
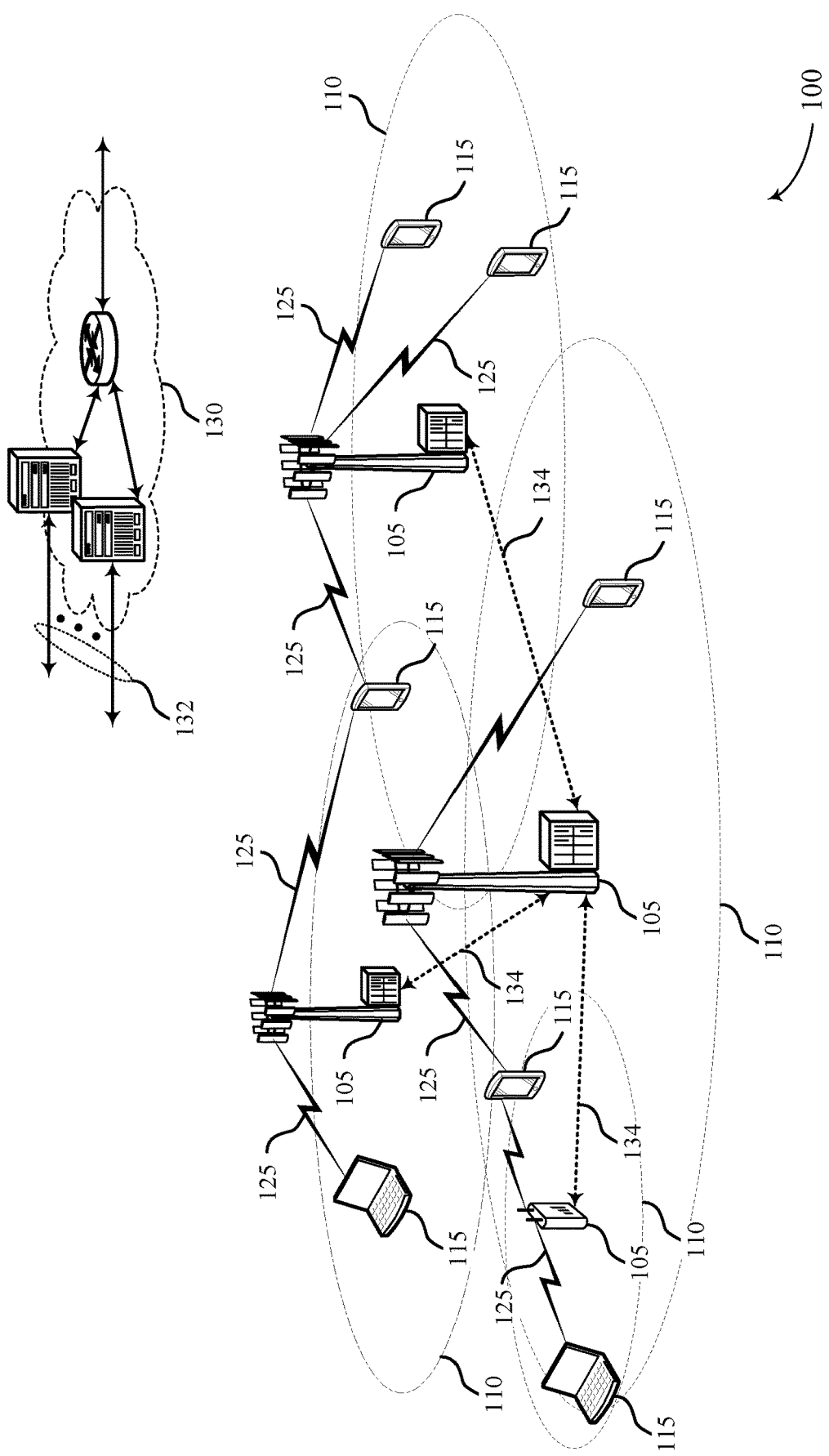
FIG. 1 illustrates an example of a system for wireless communication that supports tracking reference signal (TRS) for New Radio (NR) in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE, an LTE-Advanced (LTE-A), or an NR network. In some cases, wireless communications system 100 may support enhanced broadband communications, ultra-reliable (i.e., mission critical) communications, low latency communications, and communications with low-cost and low-complexity devices. In some examples, a base station 105 may transmit TRSs that may be used by a UE to perform frequency and time tracking.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Synchronization (e.g., cell acquisition) may be performed using synchronization signals or channels transmitted by a synchronization source (e.g., a base station 105). A base station may transmit synchronization signal blocks containing discovery reference signals. Synchronization signals may include a primary synchronization signal (PSS) or a secondary synchronization signal (SSS). A UE 115 attempting to access a wireless network may perform an initial cell search by detecting a PSS from a base station 105. The PSS may enable synchronization of slot timing and may indicate a physical layer identity value. The PSS may be utilized to acquire timing and frequency portions of a cell identification (e.g., physical cell identifier (PCID)). The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix (CP) length. An SSS may be used to acquire the full PCID and other system information (e.g., subframe index). The physical broadcast channel (PBCH) may be used to acquire additional system information needed for acquisition (e.g., bandwidth, frame index, etc.). In some examples, a base station 105 may transmit an SSS but not a PSS, or a combined synchronization signal.

After receiving the PSS and SSS, the UE 115 may receive a master information block (MIB), which may be transmitted in a downlink physical channel for broadcast information (e.g., a PBCH). The MIB may contain system bandwidth information, a system frame number (SFN), and a physical hybrid automatic repeat request (HARD) indicator channel (PHICH) configuration. After decoding the MIB, the UE 115 may receive one or more system information blocks (SIBs). Different SIBs may be defined according to the type of system information conveyed. SIB1 includes access information such as cell identity information and may also indicate whether a UE 115 is allowed to camp on a cell. SIB1 also includes cell selection information (or cell selection parameters). Additionally, SIB1 includes scheduling information for other SIBs. SIB2 includes access information and parameters related to common and shared channels. In some cases, SIB2 may contain radio resource control (RRC) configuration information related to random access channel (RACH) procedures, paging, physical uplink control channel (PUCCH), physical uplink shared channel (PUSCH), power control, sounding reference signal (SRS), and cell barring. SIB3 includes cell reselection parameters. SIB4 and SIB5 include reselection information about neighboring LTE cells. SIB6 through SIB8 include reselection information about non-LTE neighboring cells. SIB9 includes the name of a Home eNB. SIB10 through SIB12 include emergency notification information (e.g., tsunami and earthquake warnings) and SIB13 includes information related to multimedia broadcast multicast services (MBMS) configuration Wireless communications system 100 may operate in an ultra high frequency (UHF) frequency region using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station) and a receiver (e.g., a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the RRC protocol layer may provide establishment, configuration, and maintenance of an RRC connection between a UE 115 and a network device (e.g., a base station 105) or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 kHz frequency range). A resource block may contain 12 consecutive subcarriers in the frequency domain and, for a normal cyclic prefix in each orthogonal frequency division multiplexed (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD), TDD or a combination of both.

Figure 2:
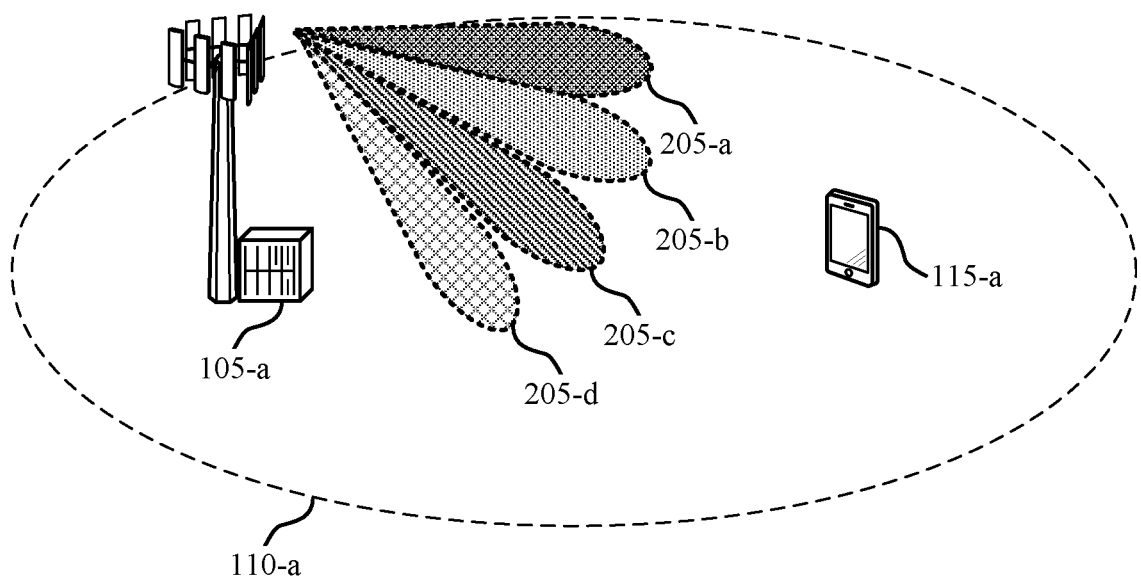
FIG. 2 illustrates an example of a wireless communications system that supports TRS for NR in accordance with aspects of the present disclosure.

FIG. 2 illustrates an example of a wireless communications system 200 that supports TRS for NR in accordance with various aspects of the present disclosure. As shown, wireless communications system 200 may use beams 205 (e.g., beam 205-a, beam 205-b, beam 205-c, or beam 205-d) for transmission and/or reception. In some cases, the base station 105-a may transmit a plurality of beamformed signals using beams 205 (e.g., reference signals) in a shaped or directional manner where each beam 205 is transmitted in a different direction. For example, beam 205-a may be transmitted in a first direction or shape, beam 205-b may be transmitted in a second direction or shape, etc.

In some wireless systems (e.g., NR wireless systems, such as wireless communications system 200), a UE 115, such as UE 115-a, may wake up from an idle state and enter a connected state with base station 105-a within a network. Base station 105-a may transmit periodic synchronization signals (e.g., over beams 205-a, 205-b, 205-c, and 205-d) for initial UE configuration. In some cases, base station 105-a may transmit the synchronization signals in a synchronization block or synchronization signal (SS) block. The synchronization block may include one or more PBCHs, a PSS, and an SSS. The synchronization block may span a set of symbol periods in the time domain, and a portion of a bandwidth in the frequency domain. For example, the synchronization block may span four symbol periods in the time domain, and a bandwidth spanning six resource blocks (RBs) in the frequency domain. UE 115-a, upon connecting with base station 105-a, may receive the synchronization block and may perform configuration processes based on information contained within the synchronization block. In some cases, UE 115-a may perform time or frequency tracking based on a synchronization signal within the received synchronization block.

Base station 105-a may transmit a reference signal in addition to the synchronization block for time or frequency tracking. The reference signal may be referred to as a TRS. Base station 105-a may transmit the TRS at a same subcarrier spacing (e.g., 30 kHz) as the synchronization block. In some cases, base station 105-a may determine that UE 115-a is in a connected mode with base station 105-a and may transmit the TRS based on the determination that UE 115-a is in the connected mode. In other cases, base station 105-a may determine that no UE 115 is in a connected mode with base station 105-a. Accordingly, base station 105-a may refrain from transmitting the TRS based on the determination that no UE 115 is in the connected mode.

Base station 105-a may transmit the TRS over a portion of the symbols spanned by the synchronization block. For example, base station 105-a may transmit a TRS during a same symbol period as the one or more PBCHs of the synchronization block. In another example, base station 105-a may transmit the TRS over the set of symbol periods spanned by the synchronization block. In some cases, base station 105-a may transmit TRS with each of the periodic synchronization blocks transmissions. In other cases, base station 105-a may transmit TRS periodically over a subset of the periodic synchronization block transmissions. For example, base station 105-a may transmit TRS with every fourth periodical synchronization block transmission.

Base station 105-a may transmit the TRS in a second portion of bandwidth that is exclusive from the portion of bandwidth spanned by the synchronization block. In some cases, an aggregation of the second portion of bandwidth and the first portion of bandwidth may span the entire bandwidth of the carrier. In other cases, the aggregation of the second portion of bandwidth and the first portion of bandwidth may span a subset of the bandwidth of the carrier. In some cases, base station 105-a may transmit a TRS in each contiguous subcarrier in the frequency domain within the second portion of bandwidth. In other cases, base station 105-a may transmit a punctured TRS pattern, where base station 105-a interleaves subcarriers transmitting TRS with subcarriers not transmitting TRS. For example, base station 105-a may transmit TRS on multiple sets of at least two subcarriers, where each of the multiple sets of at least two subcarriers is separated by one or more subcarriers without TRS.

In some cases, base station 105-a or the network may configure the bandwidth, TRS density (i.e., the proportion of subcarriers carrying TRS to the total number of subcarriers within the second portion of bandwidth), the puncturing pattern, or the periodicity of TRS transmissions.

UE 115-a may receive the TRS and may perform fine time tracking, frequency tracking, or both based on the received TRS. The UE 115-a may transmit data (e.g., high data rate data transmissions) to base station 105-a based on the time or frequency tracking.

In some cases, base station 105-a may transmit a widened synchronization block. For example, the widened synchronization block may span a wider bandwidth (e.g., 12 RBs) than a normal synchronization block (e.g., which may span 6 RBs). A PBCH, PSS, and SSS of the widened synchronization block may fully occupy the wider bandwidth.

In some cases, base station 105-a may transmit TRS over paired resources within a TTI, where a first TRS of the pair of TRS is transmitted in a common control region, and a second TRS of the pair of TRS is transmitted in a data region. For example, base station 105-a may transmit the first TRS in a common search space or a common control resource set. The first TRS may be a common control reference signal used for demodulation of the control channel. After a predetermined time interval (e.g., a predetermined number of symbol periods, etc.), base station 105-a may transmit the second TRS in the data region, with each symbol of the second TRS paired (on a corresponding subcarrier) to a symbol of the common control reference signal. That is, the subcarrier mapping for the common control reference signal and second TRS may be the same. Base station 105-a or the network may configure the bandwidth, time interval, and periodicity between pairs of TRS. The TRS may be transmitted periodically regardless of whether control or data is present to be sent in a given slot.

In some cases, base station 105-a may allocate resources within the data region for TRS. In some cases, base station 105-a may transmit multiple pairs of TRS spanning a portion of bandwidth. Each pair of the multiple paired TRS symbols may be transmitted at a same frequency within the portion of bandwidth. Base station 105-a may transmit the TRS in the allocated resources on a downlink transmission. Base station 105-*a* or the network may configure the bandwidth, TRS density, puncturing pattern, subcarrier spacing, and periodicity.

In some cases, the UE 115-*a* may perform a cold start (e.g., due to transition from an idle mode (e.g., RRC_IDLE) to a connected mode (RRC_CONNECTED), a wake up after a long connected mode discontinuous reception (CDRX) cycle, or after activation of a secondary cell). In such instances, base station 105-*a* may transmit one or more supplementary cold start TRSs according to a given TRS pattern that provides sufficient TRS resources for UE 115-*a* to converge the tracking loops within the cold start TRSs. The TRS pattern may be repeated in multiple slots to ensure an adequate or amount of time for TRS transmission to be received by UE 115-*a*. Alternatively, base station 105-*a* may designate a given TTI for transmission of a dense TRS pattern. For instance, multiple TRSs may be transmitted within the given TTI and may be mapped to at least one quarter of the symbol periods of the TTI and/or subcarriers of the system bandwidth within the TTI. In some cases, the TRS may be mapped to at least one half of the symbol periods of the TTI and/or subcarriers of the system bandwidth within the TTI.

TRS transmission timing for cold start may be determined relative to RRC connected active state transition, CDRX cycle, activation MAC control element (CE) command or may be signaled via downlink control information (DCI) to UE 115-*a* or through a group common physical downlink control channel (PDCCH).

In some cases, base station 105-*a* may periodically transmit one or more TRSs to train the loop opportunistically. In this case, the demodulation performance may not be guaranteed until the tracking loop at UE 115-*a* is fully converged.

Figure 3:
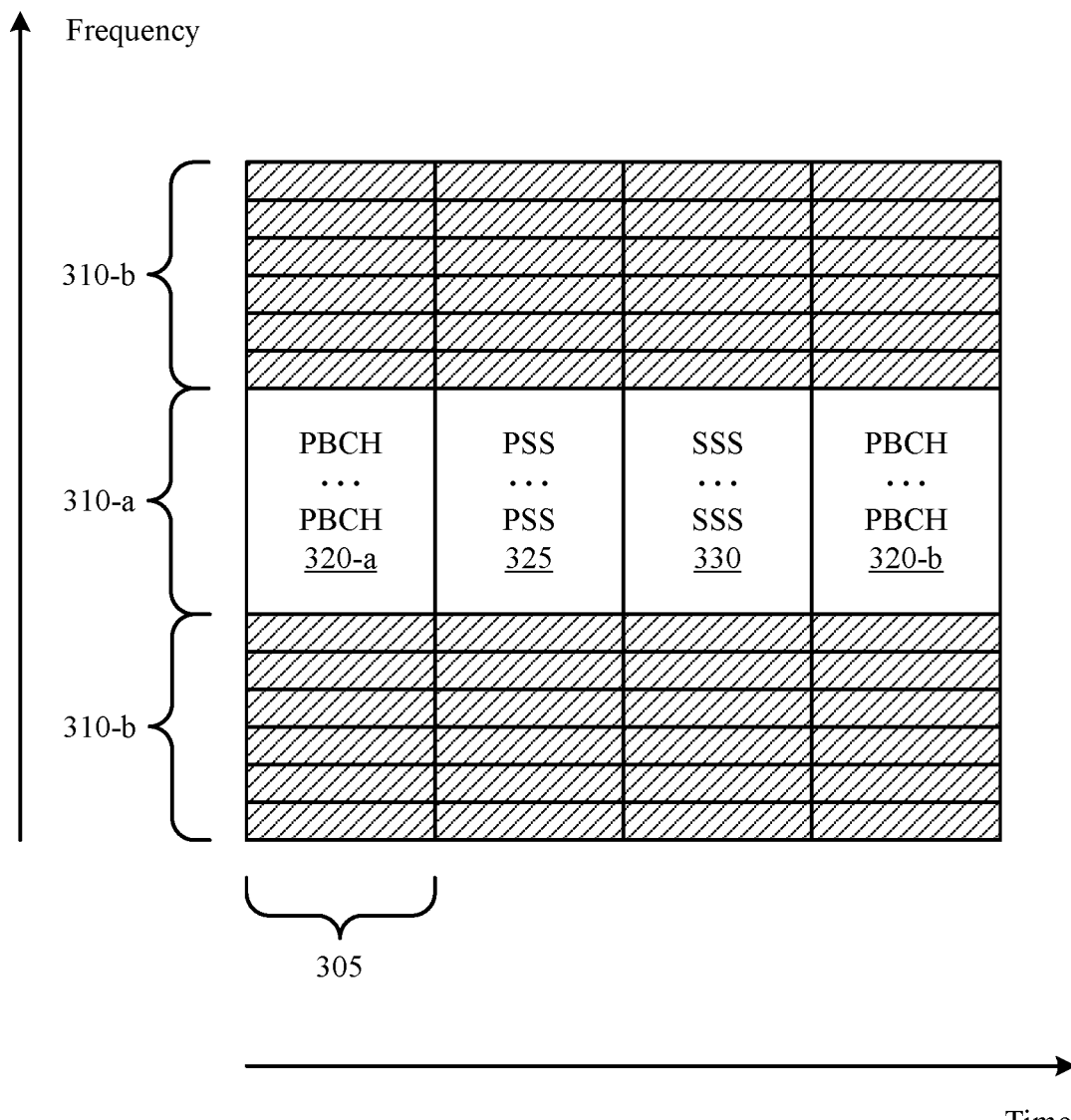
FIG. 3 illustrates an example of a resource allocation scheme that supports TRS for NR in accordance with aspects of the present disclosure.

FIG. 3 illustrates an example of a TRS transmission 300 that supports TRS for NR in accordance with various aspects of the present disclosure. A base station 105, such as a base station 105 or 105-*a* as described with reference to FIGS. 1 and 2, may transmit TRS transmission 300. TRS transmission 300 may include a synchronization block, which may include one or more PBCHs 320 (e.g., PBCH 320-*a* and 320-*b*), PSS 325, and SSS 330. The synchronization block may span a set of symbol periods 305 (e.g., four symbol periods) in the time domain and a first portion of bandwidth 310-*a* in the frequency domain. TRS transmission 300 may also include one or more TRSs 315, which may span a subset of the set of symbol periods 305 spanned by the synchronization block in the time domain and may span a second portion of bandwidth 310-*b* in the frequency domain. The first portion of bandwidth 310-*a* and the second portion of bandwidth 310-*b* may be mutually exclusive.

A base station may transmit TRS transmission 300 at a configured periodicity. The base station 105 may allocate the second portion of bandwidth 310-*b* for transmission of TRSs 315. The base station 105 may transmit a TRS 315 over every subcarrier within the second portion of bandwidth 310-*b*. A UE 115 may receive TRS transmission 300 and may perform fine frequency or time tracking based on the received TRSs 315. In some cases, a narrowband carrier may utilize a full TRS 315 implementation.

Figure 4:
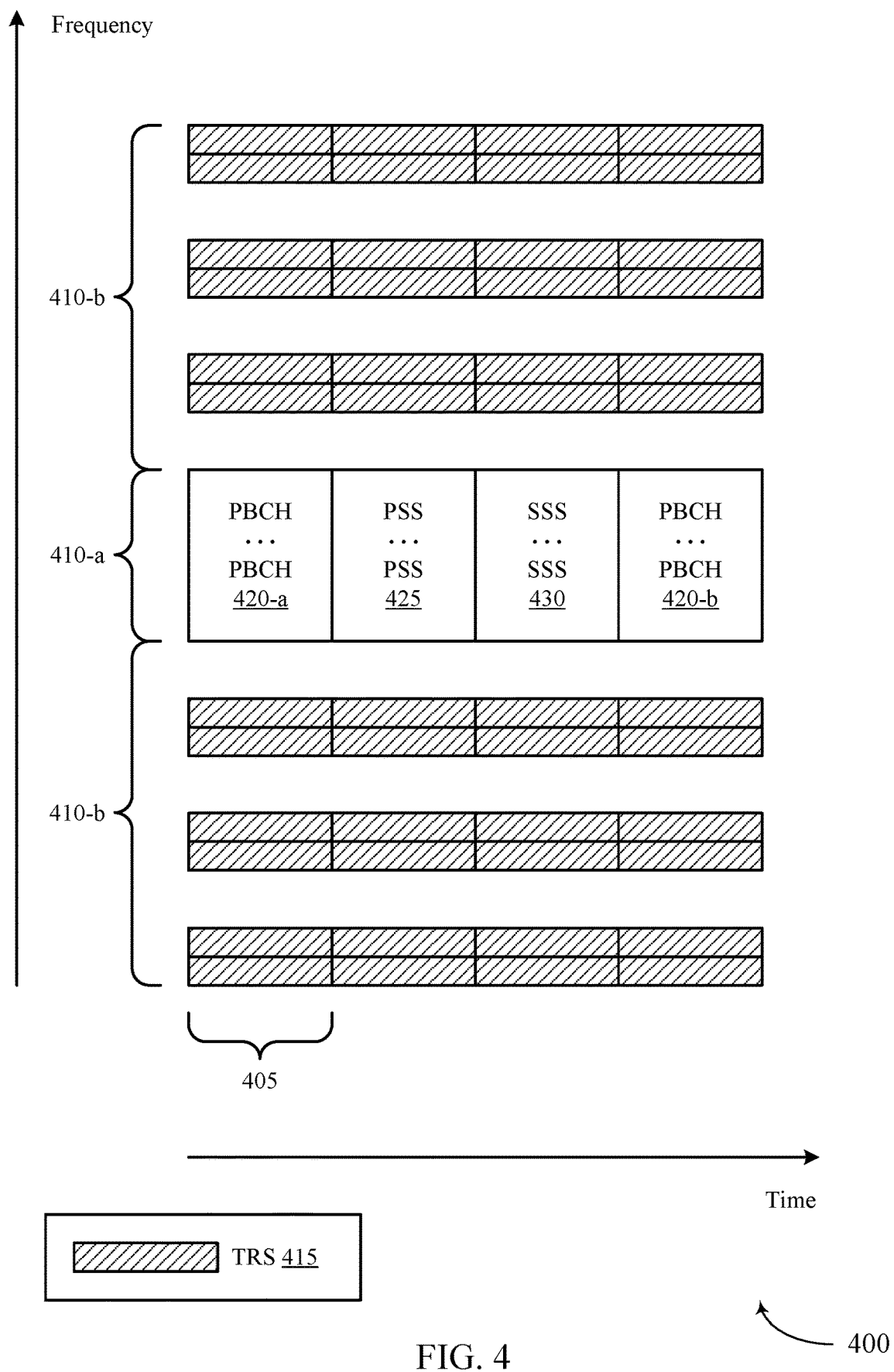
FIG. 4 illustrates an example of a resource allocation scheme that supports TRS for NR in accordance with aspects of the present disclosure.

FIG. 4 illustrates an example of a punctured TRS transmission 400 that supports TRS for NR in accordance with various aspects of the present disclosure. A base station 105, such as a base station 105 or 105-*a* as described with reference to FIGS. 1 and 2, may transmit punctured TRS transmission 400. Punctured TRS transmission 400 may include a synchronization block, which may include one or more PBCHs 320 (e.g., PBCH 420-*a* and 420-*b*), PSS 425, and SSS 430. The synchronization block may span a set of symbol periods 405 (e.g., four symbol periods) in the time domain and a first portion of bandwidth 410-*a* in the frequency domain. TRS transmission 400 may also include one or more TRSs 415, which may span a subset of the set of symbol periods 405 spanned by the synchronization block in the time domain, and may span a second portion of bandwidth 410-*b* in the frequency domain. The first portion of bandwidth 410-*a* and the second portion of bandwidth 410-*b* may be mutually exclusive.

A base station 105 may transmit TRSs 415 in the second portion of bandwidth 410-*b* using a puncturing pattern. In some cases, the base station may determine a puncturing pattern, and transmit an indication of the puncturing pattern to a UE 115. In other cases, the base station 105 may be configured to transmit using a predetermined puncturing pattern. When transmitting TRSs 415 using a puncturing pattern, the base station 105 may transmit TRSs 415 over a plurality of sets of one or more adjacent subcarriers. The plurality of sets may be separated by one or more subcarriers where the base station 105 may refrain from transmitting TRSs 415. The base station 105 may utilize fewer resources by using a puncturing pattern than when transmitting over every subcarrier within the second portion of bandwidth 410-*b*. The punctured TRS transmission 400 illustrates a 50% puncturing pattern. However, any other form of puncturing pattern may be implemented by the base station 105 to transmit TRSs 415. In some cases, a wideband carrier may utilize a punctured TRS 415 implementation.

Figure 5:
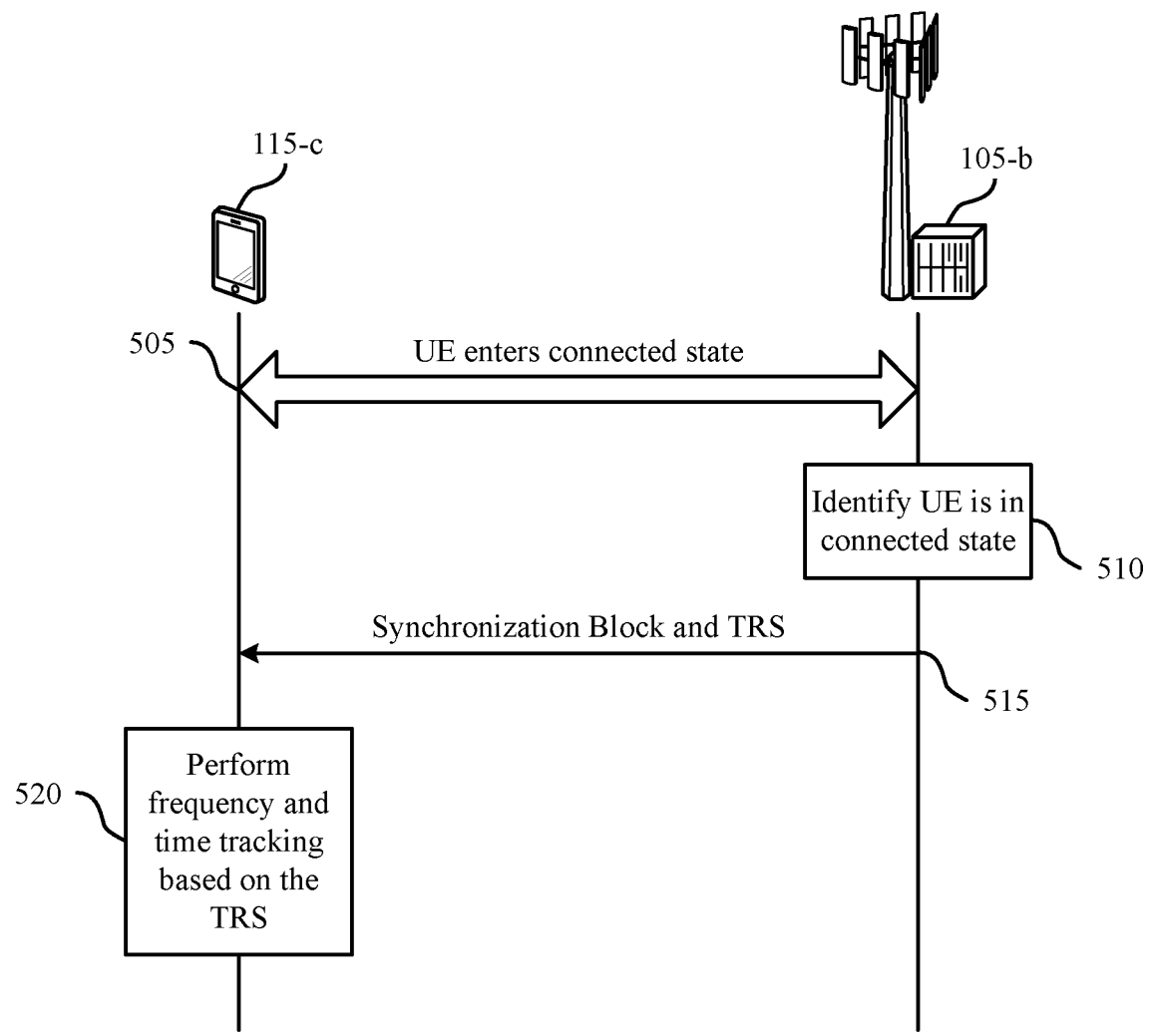
FIG. 5 illustrates an example of a process flow that supports TRS for NR in accordance with aspects of the present disclosure.

FIG. 5 illustrates an example of a process flow 500 that supports TRS for NR in accordance with various aspects of the present disclosure. Process flow 500 may include UE 115-*c*, which may be an example of a UE 115 or UE 115-*a* or 115-*b* as described with reference to FIGS. 1 and 2. Additionally, process flow 500 may include base station 105-*b*, which may be an example of a base station 105 or base station 105-*a* as described with reference to FIGS. 1 and 2. Base station 105-*b* may transmit TRS to aid in time and frequency tracking for UE 115-*c*.

At step 505, UE 115-*c* may transition from an idle state to a connected state with base station 105-*b* (e.g., via a connectivity procedure).

At step 510, base station 105-*b* may identify that a UE (e.g., UE 115-*c*) is in a connected state with base station 105-*b*.

At step 515, base station 105-*b* may transmit a synchronization block. Based on identifying that UE 115-*c* is in a connected state with base station 105-*b*, base station 105-*b* may also transmit one or more TRSs. The TRSs and the synchronization block may occupy different subcarriers within the same symbol periods. UE 115-*c* may receive the synchronization block and the TRSs.

At step 520, UE 115-*c* may perform frequency tracking, time tracking, or both based on receiving the TRSs at step 515. UE 115-*c* may configure time and frequency resources for transmissions to base station 105-*b* based on the frequency and time tracking.

Figure 6:
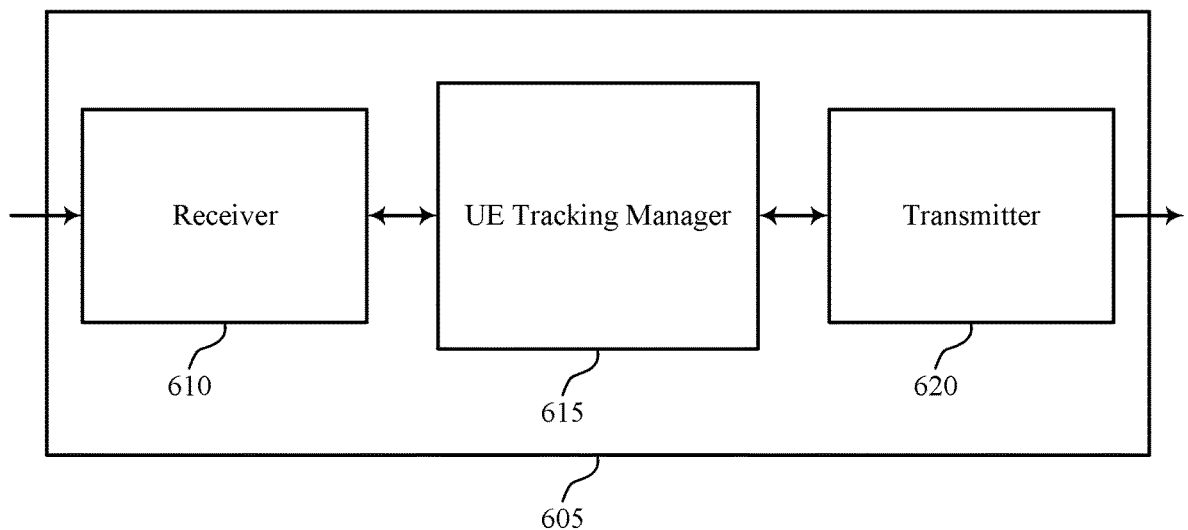
FIGS. 6 through 8 show block diagrams of a device that supports TRS for NR in accordance with aspects of the present disclosure.

FIG. 6 shows a block diagram 600 of a wireless device 605 that supports TRS for NR in accordance with various aspects of the present disclosure. Wireless device 605 may be an example of aspects of a UE 115 as described with reference to FIGS. 1, 2, and 5. Wireless device 605 may include receiver 610, UE tracking manager 615, and transmitter 620. wireless device 605 may also include a processor. Each of these components may be in communication with one another (e.g., via one or more buses).

Receiver 610 may receive information such as packets, user data, or control information associated with various information channels (e.g., control channels, data channels, and information related to TRS for NR, etc.). Information may be passed on to other components of the device. The receiver 610 may be an example of aspects of the transceiver 935 described with reference to FIG. 9.

UE tracking manager 615 may be an example of aspects of the UE tracking manager 915 described with reference to FIG. 9.

UE tracking manager 615 and/or at least some of its various sub-components may be implemented in hardware, software executed by a processor, firmware, or any combination thereof. If implemented in software executed by a processor, the functions of the UE tracking manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE tracking manager 615 and/or at least some of its various sub-components may be physically located at various positions, including being distributed such that portions of functions are implemented at different physical locations by one or more physical devices. In some examples, UE tracking manager 615 and/or at least some of its various sub-components may be a separate and distinct component in accordance with various aspects of the present disclosure. In other examples, UE tracking manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE tracking manager 615 may identify, by a UE in a connected mode with a base station, a set of symbol periods of a synchronization block periodically transmitted by the base station, the synchronization block spanning a first portion of a bandwidth of a carrier and including at least one synchronization signal and receive, over a set of the identified set of symbol periods, a reference signal including a set of sub-patterns, each of the set of sub-patterns spanning at least two adjacent subcarriers having a subcarrier spacing that is the same as the at least one synchronization signal, the reference signal spanning a second portion of the bandwidth that is exclusive of the first portion of the bandwidth. The UE tracking manager 615 may perform frequency and time tracking of the carrier based on the reference signal.

In some examples, the UE tracking manager 615 may receive, by a UE in a connected mode with a base station, a first reference signal transmitted by the base station in a control channel of a TTI of a carrier, the first reference signal being a demodulation reference signal for the control channel and being mapped to a set of subcarriers of the carrier. The UE tracking manager 615 may also receive a second reference signal in a data channel of the TTI, the second reference signal having a set of symbols, each of the set of symbols being mapped to a corresponding one of the set of subcarriers (the sets of subcarriers for the first and second reference signals may be the same), and perform frequency and time tracking of the carrier based on the first and second reference signals.

Additionally or alternatively, UE tracking manager 615 may identify, by a UE in a connected mode with a base station, a set of resources for a TRS periodically transmitted by the base station in a data region of a first TTI, the TRS including a set of sub-patterns for a set of sub-carriers of a carrier for the UE for a set of symbol periods in the first TTI, the set of sub-patterns spanning a first portion of a bandwidth of the carrier, receive the TRS on the identified set of resources, and perform frequency and time tracking of the carrier based on the received TRS.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
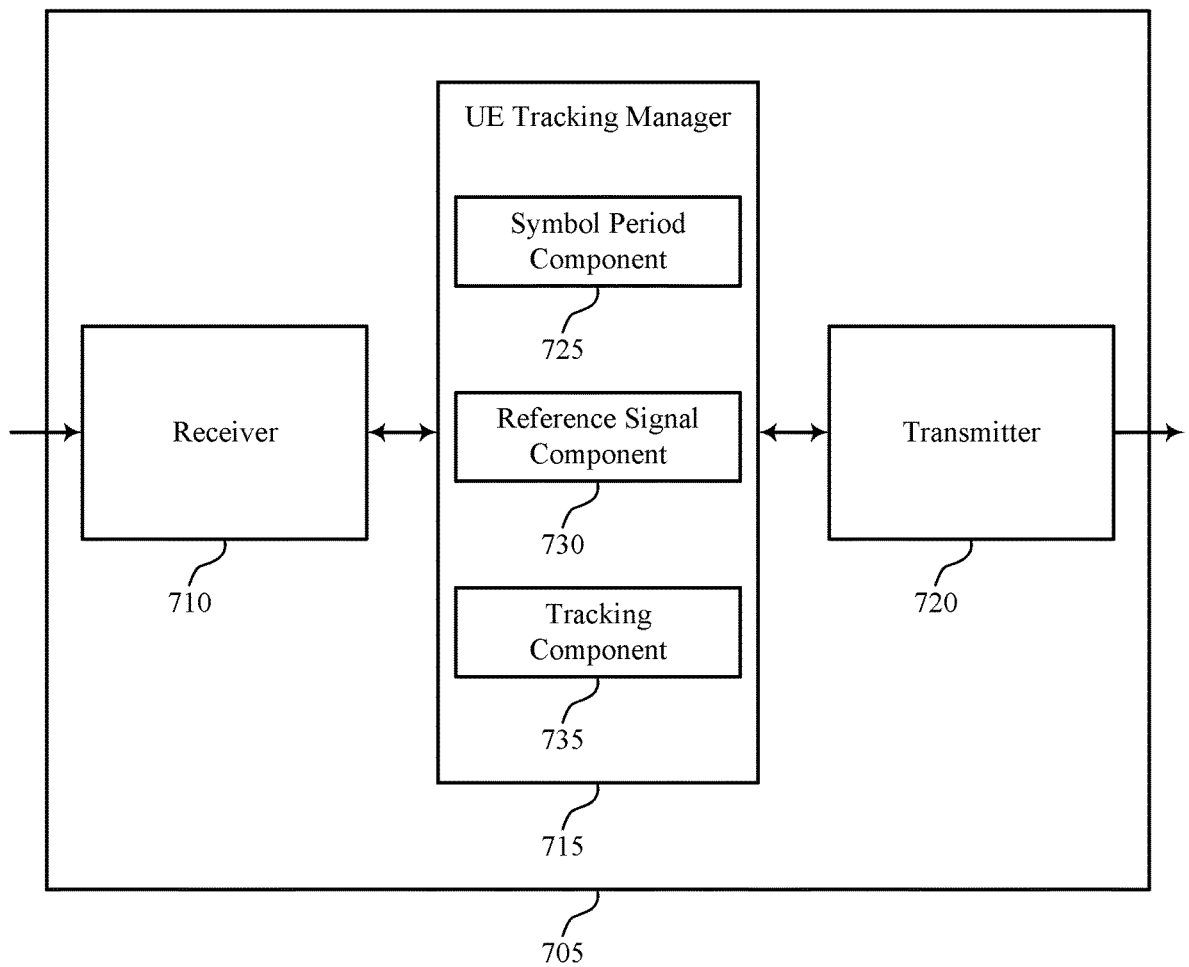

FIG. 7 shows a block diagram 700 of a wireless device 705 that supports TRS for NR in accordance with various aspects of the present disclosure. Wireless device 705 may be an example of aspects of a wireless device 605 or a UE 115 as described with reference to FIGS. 1, 2, 5, and 6. Wireless device 705 may include receiver 710, UE tracking manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to TRS for NR, etc.). Information may be passed on to other components of the device. The receiver 710 may be an example of aspects of the transceiver 935 described with reference to FIG. 9.

UE tracking manager 715 may be an example of aspects of the UE tracking manager 915 described with reference to FIG. 9. UE tracking manager 715 may also include symbol period component 725, reference signal component 730, and tracking component 735.

Symbol period component 725 may identify, by a UE in a connected mode with a base station, a set of resources for a TRS periodically transmitted by the base station in a data region of a first TTI, the TRS including a set of sub-patterns for a set of sub-carriers of a carrier for the UE for a set of symbol periods in the first TTI, the set of sub-patterns spanning a first portion of a bandwidth of the carrier. In some cases, symbol period component 725 may identify the set of sub-carriers for the TRS based on a set of sub-carriers for a received demodulation reference signal (DMRS). In some cases, the set of sub-patterns include paired symbol periods transmitted on a same sub-carrier. In some cases, the first TTI includes a downlink TTI. In some cases, the set of sub-patterns of subcarriers spans the bandwidth of the carrier, including across all subcarriers of the bandwidth. In some cases, the set of sub-patterns are separated by at least one subcarrier within the first portion of the bandwidth. In some cases, the TRS extends across an entirety of the bandwidth of the carrier. Additionally, symbol period component 725 may identify a second set of resources for the TRS periodically transmitted by the base station in a data region of a second TTI, the second set of resources including the set of sub-patterns for the set of sub-carriers in the second TTI In some examples, symbol period component 725 may identify, by a UE in a connected mode with a base station, a set of symbol periods of a synchronization block periodically transmitted by the base station, the synchronization block spanning a first portion of a bandwidth of a carrier and including at least one synchronization signal.

Reference signal component 730 may receive, from the base station, configuration information for the TRS, the configuration information including the first portion of the bandwidth, or a density, or a puncturing pattern, or a subcarrier spacing, or a combination thereof, where the set of resources for the tracking is determined based on the received configuration information for the TRS, receive the TRS on the identified set of resources, receive a supplemental TRS over a set of TTIs, the supplemental TRS including a same set of sub-patterns as the set of sub-patterns of the TRS periodically transmitted by the base station, receive a supplemental TRS over a second TTI, the supplemental TRS including a second set of sub-patterns for a second set of sub-carriers, the second set of sub-patterns spanning at least a portion of the bandwidth of the carrier, and at least one of the second set of sub-patterns different from the set of sub-patterns of the TRS periodically transmitted by the base station, and receive the TRS over a set of TTIs. In some cases, a density of the supplemental TRS in the second TTI is greater than the density of the TRS in the first TTI. Additionally, reference signal component 730 may receive the TRS on the identified second set of resources.

In some examples, reference signal component 730 may receive, over a set of the identified set of symbol periods, a reference signal including a set of sub-patterns, each of the set of sub-patterns spanning at least two adjacent subcarriers having a subcarrier spacing that is the same as the at least one synchronization signal, the reference signal spanning a second portion of the bandwidth that is exclusive of the first portion of the bandwidth. Reference signal component 730 may receive a supplemental reference signal over at least one tracking TTI, the supplemental reference signal spanning at least the second portion of the bandwidth of the carrier and having, in each of a set of symbol periods of the TTI, a number of the set of sub-patterns that is equal to or greater than the reference signal. Reference signal component 730 may receive, by a UE in a connected mode with a base station, a first reference signal transmitted by the base station in a control channel of a TTI of a carrier, the first reference signal being a demodulation reference signal for the control channel and being mapped to a set of subcarriers of the carrier, and receive a second reference signal in a data channel of the TTI, the second reference signal having a set of symbols, each of the set of symbols being mapped to a corresponding one of the set of subcarriers. In some cases, the set of sub-patterns collectively span all subcarriers within the second portion of the bandwidth. In some cases, the set of sub-patterns are separated by at least one subcarrier within the second portion of the bandwidth. In some cases, the receiving includes receiving the reference signal on all symbols periods of the set of symbol periods of the synchronization block. In some cases, the reference signal extends across an entirety of the bandwidth of the carrier.

Tracking component 735 may perform frequency and time tracking of the carrier based on the received TRS and perform the frequency and time tracking of the carrier based on identifying that a tracking loop for the TRS received over the set of TTIs has converged. In some cases, the frequency and time tracking of the carrier is based on the received TRS in the first TTI and the received tracking reference signal in the second TTI.

In some examples, tracking component 735 may perform frequency and time tracking of the carrier based on the reference signal and perform frequency and time tracking of the carrier based on the first and second reference signals.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
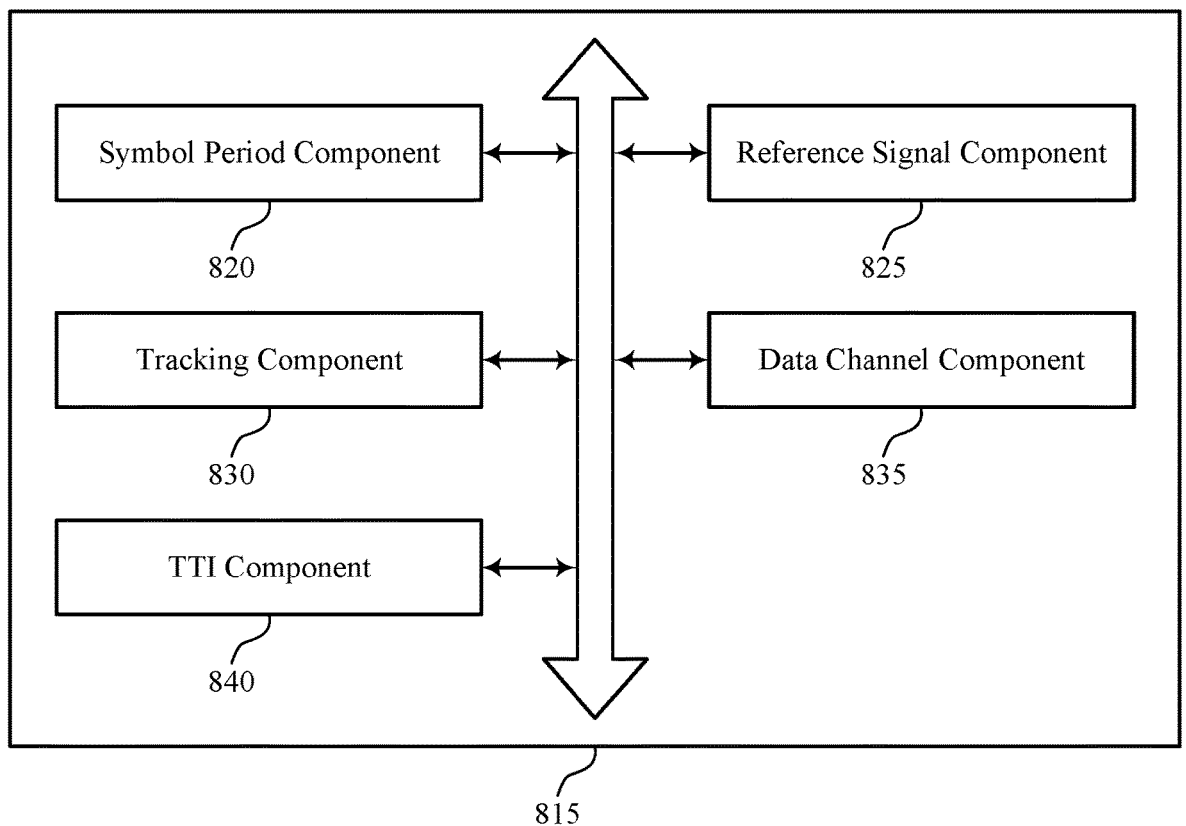

FIG. 8 shows a block diagram 800 of a UE tracking manager 815 that supports TRS for NR in accordance with various aspects of the present disclosure. The UE tracking manager 815 may be an example of aspects of a UE tracking manager 615, a UE tracking manager 715, or a UE tracking manager 915 described with reference to FIGS. 6, 7, and 9. The UE tracking manager 815 may include symbol period component 820, reference signal component 825, tracking component 830, data channel component 835, and TTI component 840. Each of these modules may communicate, directly or indirectly, with one another (e.g., via one or more buses).

Symbol period component 820 may identify, by a UE in a connected mode with a base station, a set of resources for a TRS periodically transmitted by the base station in a data region of a first TTI, the TRS including a set of sub-patterns for a set of sub-carriers of a carrier for the UE for a set of symbol periods in the first TTI, the set of sub-patterns spanning a first portion of a bandwidth of the carrier and identify the set of sub-carriers for the TRS based on the set of sub-carriers for the received demodulation reference signal. In some cases, the set of sub-patterns include paired symbol periods transmitted on a same sub-carrier. In some cases, the first TTI includes a downlink TTI. In some cases, the set of sub-patterns of subcarriers spans the bandwidth of the carrier. In some cases, the set of sub-patterns are separated by at least one subcarrier within the first portion of the bandwidth. In some cases, the TRS extends across an entirety of the bandwidth of the carrier. Additionally, symbol period component 820 may identify a second set of resources for the TRS periodically transmitted by the base station in a data region of a second TTI, the second set of resources including the set of sub-patterns for the set of sub-carriers in the second TTI.

In some examples, symbol period component 820 may identify, by a UE in a connected mode with a base station, a set of symbol periods of a synchronization block periodically transmitted by the base station, the synchronization block spanning a first portion of a bandwidth of a carrier and including at least one synchronization signal.

Reference signal component 825 may receive, from the base station, configuration information for the TRS, the configuration information including the first portion of the bandwidth, or a density, or a puncturing pattern, or a subcarrier spacing, or a combination thereof, where the set of resources for the tracking is determined based on the received configuration information for the TRS, receive the TRS on the identified set of resources, receive a supplemental TRS over a set of TTIs, the supplemental TRS including a same set of sub-patterns as the set of sub-patterns of the TRS periodically transmitted by the base station, receive a supplemental TRS over a second TTI, the supplemental TRS including a second set of sub-patterns for a second set of sub-carriers, the second set of sub-patterns spanning at least a portion of the bandwidth of the carrier, and at least one of the second set of sub-patterns different from the set of sub-patterns of the TRS periodically transmitted by the base station, and receive the TRS over a set of TTIs. In some cases, a density of the supplemental TRS in the second TTI is greater than the density of the TRS in the first TTI.

Additionally, reference signal component 825 may receive the TRS on the identified second set of resources.

In some examples, reference signal component 825 may receive, over a set of the identified set of symbol periods, a reference signal including a set of sub-patterns, each of the set of sub-patterns spanning at least two adjacent subcarriers having a subcarrier spacing that is the same as the at least one synchronization signal, the reference signal spanning a second portion of the bandwidth that is exclusive of the first portion of the bandwidth, and receive a supplemental reference signal over at least one tracking TTI, the supplemental reference signal spanning at least the second portion of the bandwidth of the carrier and having, in each of a set of symbol periods of the TTI, a number of the set of sub-patterns that is equal to or greater than the reference signal. Reference signal component 825 may receive, by a UE in a connected mode with a base station, a first reference signal transmitted by the base station in a control channel of a TTI of a carrier, the first reference signal being a demodulation reference signal for the control channel and being mapped to a set of subcarriers of the carrier, and receive a second reference signal in a data channel of the TTI, the second reference signal having a set of symbols, each of the set of symbols being mapped to a corresponding one of the set of subcarriers. In some cases, the set of sub-patterns collectively span all subcarriers within the second portion of the bandwidth. In some cases, the set of sub-patterns are separated by at least one subcarrier within the second portion of the bandwidth. In some cases, the receiving includes receiving the reference signal on all symbols periods of the set of symbol periods of the synchronization block. In some cases, the reference signal extends across an entirety of the bandwidth of the carrier.

Tracking component 830 may perform frequency and time tracking of the carrier based on the received TRS and perform the frequency and time tracking of the carrier based on identifying that a tracking loop for the TRS received over the set of TTIs has converged. In some cases, the frequency and time tracking of the carrier is based on the received TRS in the first TTI and the received tracking reference signal in the second TTI.

In some examples, tracking component 830 may perform frequency and time tracking of the carrier based on the reference signal and perform frequency and time tracking of the carrier based on the first and second reference signals.

Data channel component 835 may receive a data channel over a data allocation of the carrier, where a subcarrier spacing of subcarriers for the data channel is different from the subcarrier spacing of the at least two adjacent subcarriers of the reference signal.

TTI component 840 may identify a set of TTIs to receive a supplemental TRS from the base station based on a timing of a transition of the UE from an idle mode to the connected mode, or a timing of a CDRX cycle for the UE, or receiving an indicator of at least one of the set of TTIs, identify a synchronization block periodically transmitted by the base station, the synchronization block spanning a second portion of the bandwidth of the carrier in the first TTI, the second portion of the bandwidth exclusive of the first portion of the bandwidth, receive a set of synchronization signals of the synchronization block in the identified set of symbol periods of the first TTI, and receive a demodulation reference signal in a control region of the first TTI, the demodulation reference signal mapped to the set of sub-carriers of the first TTI. In some cases, the synchronization block is transmitted in at least the set of symbol periods for the TRS In some examples, TTI component 840 may identify the at least one tracking TTI based on a timing of a transition of the UE from an idle mode to the connected mode, a CDRX cycle for the UE, or receiving an indicator of the at least one tracking TTI.

Figure 9:
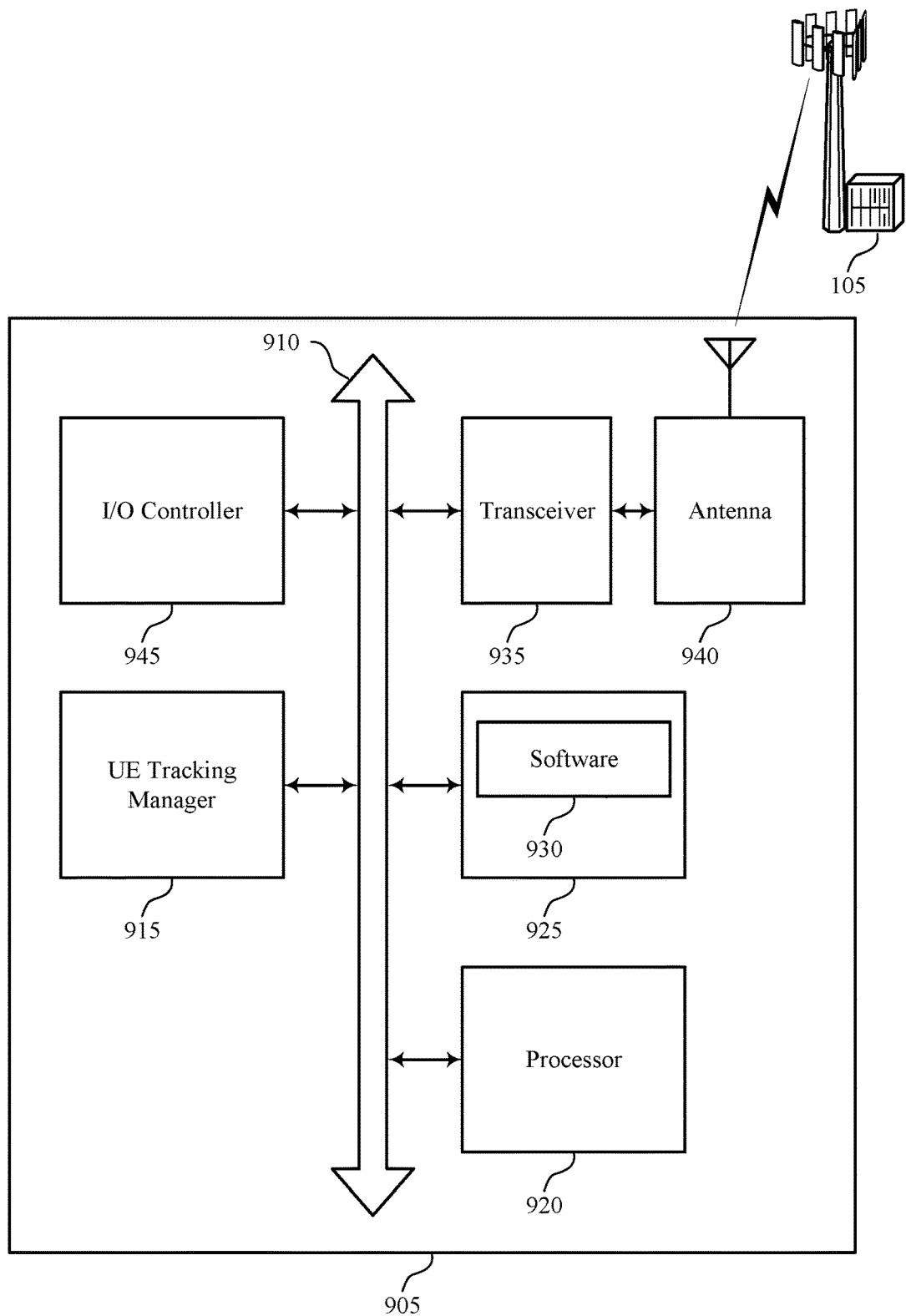
FIG. 9 illustrates a block diagram of a system including a UE that supports TRS for NR in accordance with aspects of the present disclosure.

FIG. 9 shows a diagram of a system 900 including a device 905 that supports TRS for NR in accordance with various aspects of the present disclosure. Device 905 may be an example of or include the components of wireless device 605, wireless device 705, or a UE 115 as described above, e.g., with reference to FIGS. 1, 2, 5, 6, and 7. Device 905 may include components for bi-directional voice and data communications including components for transmitting and receiving communications, including UE tracking manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting TRS for NR).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support TRS for NR. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a mouse, a keyboard, a touchscreen, or a similar device. In some cases, I/O controller 945 may be implemented as part of a processor. In some cases, a user may interact with device 905 via I/O controller 945 or via hardware components controlled by I/O controller 945.

Figure 10:
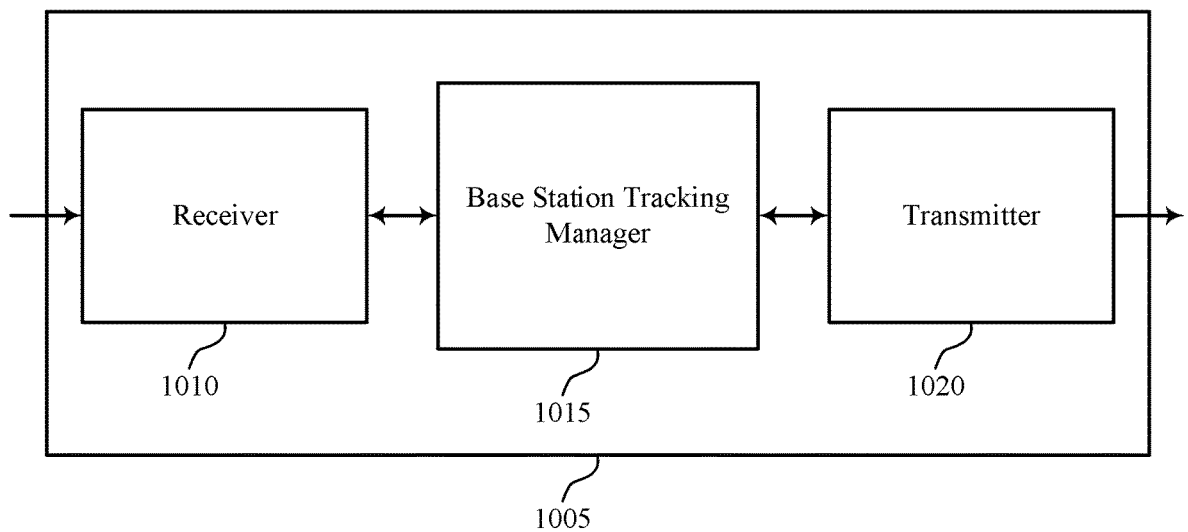
FIGS. 10 through 12 show block diagrams of a device that supports TRS for NR in accordance with aspects of the present disclosure.

FIG. 10 shows a block diagram 1000 of a wireless device 1005 that supports TRS for NR in accordance with various aspects of the present disclosure. Wireless device 1005 may be an example of aspects of a base station 105 as described with reference to FIGS. 1, 2, and 5. Wireless device 1005 may include receiver 1010, base station tracking manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to TRS for NR, etc.). Information may be passed on to other components of the device. The receiver 1010 may be an example of aspects of the transceiver 1335 described with reference to FIG. 13.

Base station tracking manager 1015 may be an example of aspects of the base station tracking manager 1315 described with reference to FIG. 13.

Base station tracking manager 1015 and/or at least some of its various sub-components may be implemented in hardware, software executed by a processor, firmware, or any combination thereof. If implemented in software executed by a processor, the functions of the base station tracking manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station tracking manager 1015 and/or at least some of its various sub-components may be physically located at various positions, including being distributed such that portions of functions are implemented at different physical locations by one or more physical devices. In some examples, base station tracking manager 1015 and/or at least some of its various sub-components may be a separate and distinct component in accordance with various aspects of the present disclosure. In other examples, base station tracking manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station tracking manager 1015 may transmit, periodically by a base station, a set of synchronization blocks, each of the set of synchronization blocks spanning set of symbol periods and a first portion of a bandwidth of a carrier and including at least one synchronization signal. Base station tracking manager 1015 may transmit, over a set of the set of symbol periods of at least one synchronization block, a reference signal including a set of sub-patterns, each of the set of sub-patterns spanning at least two adjacent subcarriers having a subcarrier spacing that is the same as the at least one synchronization signal, the reference signal spanning a second portion of the bandwidth that is exclusive of the first portion of the bandwidth. The base station tracking manager 1015 may also transmit a first reference signal in a control channel of a set of periodically occurring TTIs of a carrier, the first reference signal being a demodulation reference signal for the control channel and being mapped to a set of subcarriers of the carrier and transmit, in each of the set of periodically occurring TTIs, a second reference signal in a data channel, the second reference signal having a set of symbols, each of the set of symbols being mapped to a corresponding one of the set of subcarriers.

In some cases, base station tracking manager 1015 may determine, by a base station, a set of resources for a TRS in a data region of a first TTI, the set of resources including a set of sub-patterns for a set of sub-carriers of a carrier for a UE for a set of symbol periods in the first TTI, the set of sub-patterns spanning a first portion of a bandwidth of the carrier and transmit, periodically by the base station, the TRS on the determined set of resources in the data region.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
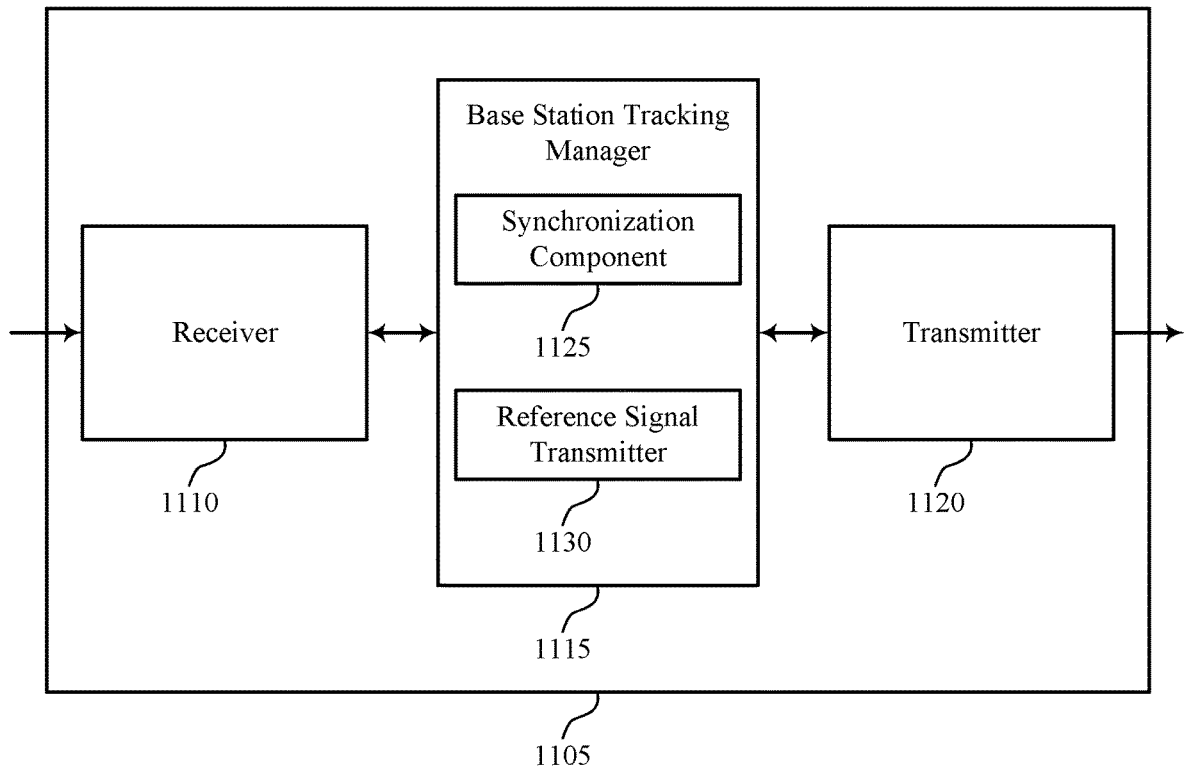

FIG. 11 shows a block diagram 1100 of a wireless device 1105 that supports TRS for NR in accordance with various aspects of the present disclosure. Wireless device 1105 may be an example of aspects of a wireless device 1005 or a base station 105 as described with reference to FIGS. 1, 2, 5, and 10. Wireless device 1105 may include receiver 1110, base station tracking manager 1115, and transmitter 1120. wireless device 1105 may also include a processor. Each of these components may be in communication with one another (e.g., via one or more buses).

Receiver 1110 may receive information such as packets, user data, or control information associated with various information channels (e.g., control channels, data channels, and information related to TRS for NR, etc.). Information may be passed on to other components of the device. The receiver 1110 may be an example of aspects of the transceiver 1335 described with reference to FIG. 13.

Base station tracking manager 1115 may be an example of aspects of the base station tracking manager 1315 described with reference to FIG. 13.

Base station tracking manager 1115 may also include synchronization component 1125 and reference signal transmitter 1130.

Synchronization component 1125 may determine, by a base station, a set of resources for a TRS in a data region of a first TTI, the set of resources including a set of sub-patterns for a set of sub-carriers of a carrier for a UE for a set of symbol periods in the first TTI, the set of sub-patterns spanning a first portion of a bandwidth of the carrier and allocate the set of sub-carriers for the TRS based on the set of sub-carriers for the transmitted demodulation reference signal. In some cases, the set of sub-patterns include paired symbol periods transmitted on a same sub-carrier. In some cases, the first TTI includes a downlink TTI. In some cases, the set of sub-patterns of subcarriers spans the bandwidth of the carrier. In some cases, the set of sub-patterns are separated by at least one subcarrier within the first portion of the bandwidth. Additionally, synchronization component 1125 may determine a second set of resources for the TRS in a data region of a second TTI, the second set of resources including the set of sub-patterns for the set of sub-carriers in the second TTI.

In some examples, synchronization component 1125 may transmit, periodically by a base station, a set of synchronization blocks, each of the set of synchronization blocks spanning set of symbol periods and a first portion of a bandwidth of a carrier and including at least one synchronization signal.

Reference signal transmitter 1130 may transmit configuration information for the TRS, the configuration information including the first portion of the bandwidth, or a density, or a puncturing pattern, or a subcarrier spacing, or a combination thereof, transmit, periodically by the base station, the TRS on the determined set of resources in the data region, transmit a supplemental TRS over a set of TTIs, the supplemental TRS including a same set of sub-patterns as the set of sub-patterns of the TRS periodically transmitted by the base station, and transmit a supplemental TRS over a second TTI, the supplemental TRS including a second set of sub-patterns for a second set of sub-carriers, the second set of sub-patterns spanning at least a portion of the bandwidth of the carrier, and at least one of the second set of sub-patterns different from the set of sub-patterns of the TRS periodically transmitted by the base station. In some cases, a density of the supplemental TRS in the second TTI is greater than the density of the TRS in the first TTI. Additionally, reference signal transmitter 1130 transmit, periodically by the base station, the TRS on the determined second set of resources.

In some examples, reference signal transmitter 1130 may transmit, over a set of the set of symbol periods of at least one synchronization block, a reference signal including a set of sub-patterns, each of the set of sub-patterns spanning at least two adjacent subcarriers having a subcarrier spacing that is the same as the at least one synchronization signal, the reference signal spanning a second portion of the bandwidth that is exclusive of the first portion of the bandwidth. Reference signal transmitter 1130 may suppress transmission of the first and second reference signals for at least one subsequent periodically occurring TTI based on the determining, and suppress transmission of the reference signal for at least one subsequent synchronization block based on the determining. Additionally, reference signal transmitter 1130 may transmit, to a UE, a supplemental reference signal spanning at least the second portion of the bandwidth of the carrier in at least one tracking TTI, the supplemental reference signal having, in each of a set of symbol periods of the tracking TTI, a number of the set of sub-patterns that is equal to or greater than the reference signal, transmit a first reference signal in a control channel of a set of periodically occurring TTIs of a carrier, the first reference signal being a demodulation reference signal for the control channel and being mapped to a set of subcarriers of the carrier, and transmit, in each of the set of periodically occurring TTIs, a second reference signal in a data channel, the second reference signal having a set of symbols, each of the set of symbols being mapped to a corresponding one of the set of subcarriers. In some cases, the set of sub-patterns collectively span all subcarriers within the second portion of the bandwidth. In some cases, the set of sub-patterns are separated by at least one subcarrier within the second portion of the bandwidth. In some cases, transmitting the reference signal includes transmitting the reference signal on all symbols periods of the set of symbol periods of the at least one synchronization block. In some cases, transmitting the reference signal includes transmitting the reference signal based on a determination that a UE is in a connected mode with the base station. In some cases, for at least one of the set of periodically occurring TTIs, no control information is present in the control channel. In some cases, transmitting the first and second reference signals includes transmitting the first and second reference signals based on a determination that a UE is in a connected mode with the base station. In some cases, transmitting the reference signal includes transmitting the reference signal extends across an entirety of the bandwidth of the carrier.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
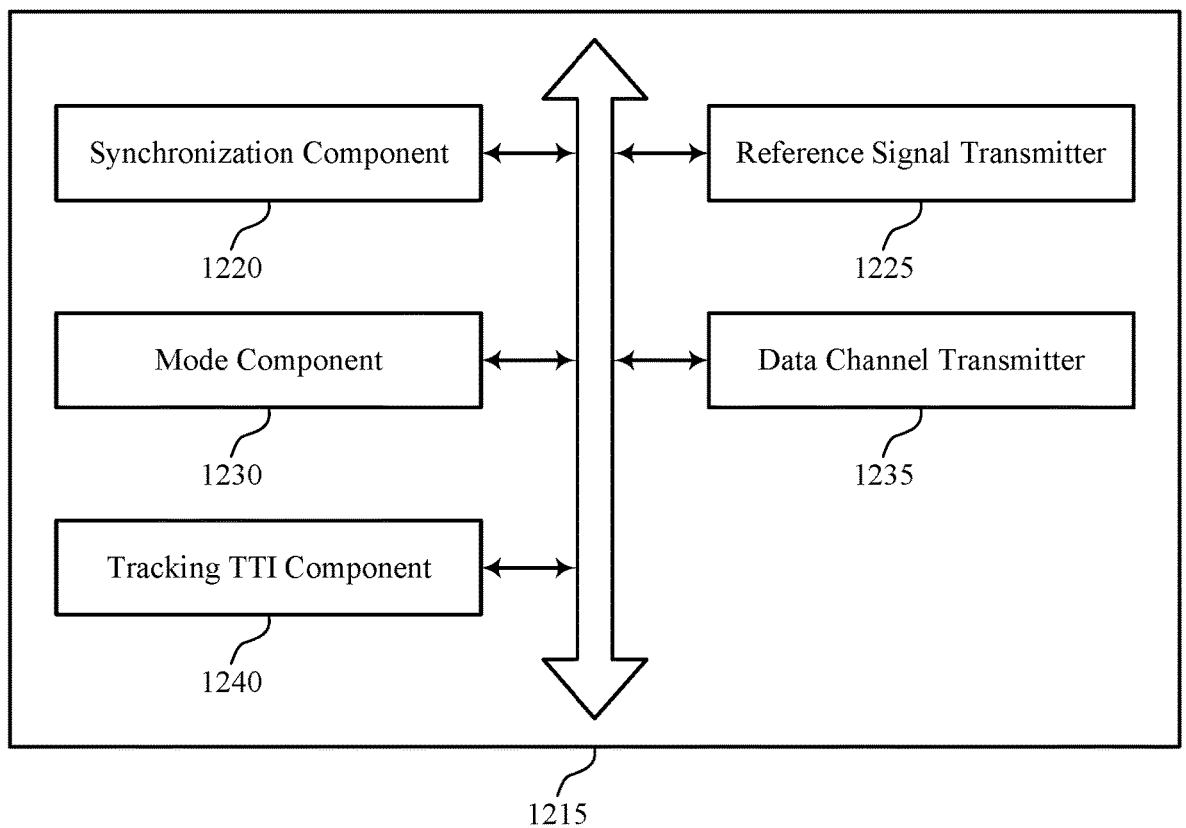

FIG. 12 shows a block diagram 1200 of a base station tracking manager 1215 that supports TRS for NR in accordance with various aspects of the present disclosure. The base station tracking manager 1215 may be an example of aspects of a base station tracking manager 1315 described with reference to FIGS. 10, 11, and 13. The base station tracking manager 1215 may include synchronization component 1220, reference signal transmitter 1225, mode component 1230, data channel transmitter 1235, and tracking TTI component 1240. Each of these modules may communicate, directly or indirectly, with one another (e.g., via one or more buses).

Synchronization component 1220 may determine, by a base station, a set of resources for a TRS in a data region of a first TTI, the set of resources including a set of sub-patterns for a set of sub-carriers of a carrier for a UE for a set of symbol periods in the first TTI, the set of sub-patterns spanning a first portion of a bandwidth of the carrier and allocate the set of sub-carriers for the TRS based on the set of sub-carriers for the transmitted demodulation reference signal. In some cases, the set of sub-patterns include paired symbol periods transmitted on a same sub-carrier. In some cases, the first TTI includes a downlink TTI. In some cases, the set of sub-patterns of subcarriers spans the bandwidth of the carrier. In some cases, the set of sub-patterns are separated by at least one subcarrier within the first portion of the bandwidth. Additionally, synchronization component 1220 may determine a second set of resources for the TRS in a data region of a second TTI, the second set of resources including the set of sub-patterns for the set of sub-carriers in the second TTI.

In some examples, synchronization component 1220 may transmit, periodically by a base station, a set of synchronization blocks, each of the set of synchronization blocks spanning set of symbol periods and a first portion of a bandwidth of a carrier and including at least one synchronization signal.

Reference signal transmitter 1225 may transmit configuration information for the TRS, the configuration information including the first portion of the bandwidth, or a density, or a puncturing pattern, or a subcarrier spacing, or a combination thereof, transmit, periodically by the base station, the TRS on the determined set of resources in the data region, transmit a supplemental TRS over a set of TTIs, the supplemental TRS including a same set of sub-patterns as the set of sub-patterns of the TRS periodically transmitted by the base station, and transmit a supplemental TRS over a second TTI, the supplemental TRS including a second set of sub-patterns for a second set of sub-carriers, the second set of sub-patterns spanning at least a portion of the bandwidth of the carrier, and at least one of the second set of sub-patterns different from the set of sub-patterns of the TRS periodically transmitted by the base station. In some cases, a density of the supplemental TRS in the second TTI is greater than the density of the TRS in the first TTI. Additionally, reference signal transmitter 1225 transmit, periodically by the base station, the TRS on the determined second set of resources.

In some examples, reference signal transmitter 1225 may transmit, over a set of the set of symbol periods of at least one synchronization block, a reference signal including a set of sub-patterns, each of the set of sub-patterns spanning at least two adjacent subcarriers having a subcarrier spacing that is the same as the at least one synchronization signal, the reference signal spanning a second portion of the bandwidth that is exclusive of the first portion of the bandwidth. Reference signal transmitter 1225 may suppress transmission of the first and second reference signals for at least one subsequent periodically occurring TTI based on the determining, and suppress transmission of the reference signal for at least one subsequent synchronization block based on the determining. Additionally, reference signal transmitter 1225 may transmit, to a UE, a supplemental reference signal spanning at least the second portion of the bandwidth of the carrier in at least one tracking TTI, the supplemental reference signal having, in each of a set of symbol periods of the tracking TTI, a number of the set of sub-patterns that is equal to or greater than the reference signal, transmit a first reference signal in a control channel of a set of periodically occurring TTIs of a carrier, the first reference signal being a demodulation reference signal for the control channel and being mapped to a set of subcarriers of the carrier, and transmit, in each of the set of periodically occurring TTIs, a second reference signal in a data channel, the second reference signal having a set of symbols, each of the set of symbols being mapped to a corresponding one of the set of subcarriers. In some cases, the set of sub-patterns collectively span all subcarriers within the second portion of the bandwidth. In some cases, the set of sub-patterns are separated by at least one subcarrier within the second portion of the bandwidth. In some cases, transmitting the reference signal includes transmitting the reference signal on all symbols periods of the set of symbol periods of the at least one synchronization block. In some cases, transmitting the reference signal includes transmitting the reference signal based on a determination that a UE is in a connected mode with the base station. In some cases, for at least one of the set of periodically occurring TTIs, no control information is present in the control channel. In some cases, transmitting the first and second reference signals includes transmitting the first and second reference signals based on a determination that a UE is in a connected mode with the base station. In some cases, transmitting the reference signal includes transmitting the reference signal extends across an entirety of the bandwidth of the carrier.

Mode component 1230 may determine that the UE has transitioned from the connected mode with the base station to an idle mode, suppress transmission of the TRS for at least one subsequent TTI based on the determining, and suppress transmission of the TRS based on the determining. In some cases, transmitting the TRS further includes transmitting the TRS based on determining that the UE is in a connected mode. In some cases, transmitting the TRS includes determining an absence of UEs in a connected mode with the base station.

In some example, mode component 1230 may determine that the UE has transitioned from the connected mode with the base station to an idle mode.

Data channel transmitter 1235 may transmit a data channel to the UE over a data allocation of the carrier, where a subcarrier spacing of subcarriers for the data channel is different from the subcarrier spacing of the at least two adjacent subcarriers of the reference signal.

Tracking TTI component 1240 may transmit, periodically by the base station, a synchronization block over a second portion of the bandwidth of the carrier in the first TTI, the second portion of the bandwidth exclusive of the first portion of the bandwidth, transmit a set of synchronization signals of the synchronization block in the set of symbol periods of the first TTI, and transmit a demodulation reference signal in a control region of the first TTI, the demodulation reference signal mapped to the set of sub-carriers of the first TTI. In some cases, the synchronization block is transmitted in at least the set of symbol periods for the TRS.

In some examples, tracking TTI component 1240 may determine the at least one tracking TTI based on a timing of a transition of the UE from an idle mode to a connected mode, a CDRX cycle for the UE and transmit an indicator of the at least one tracking TTI to the UE.

Figure 13:
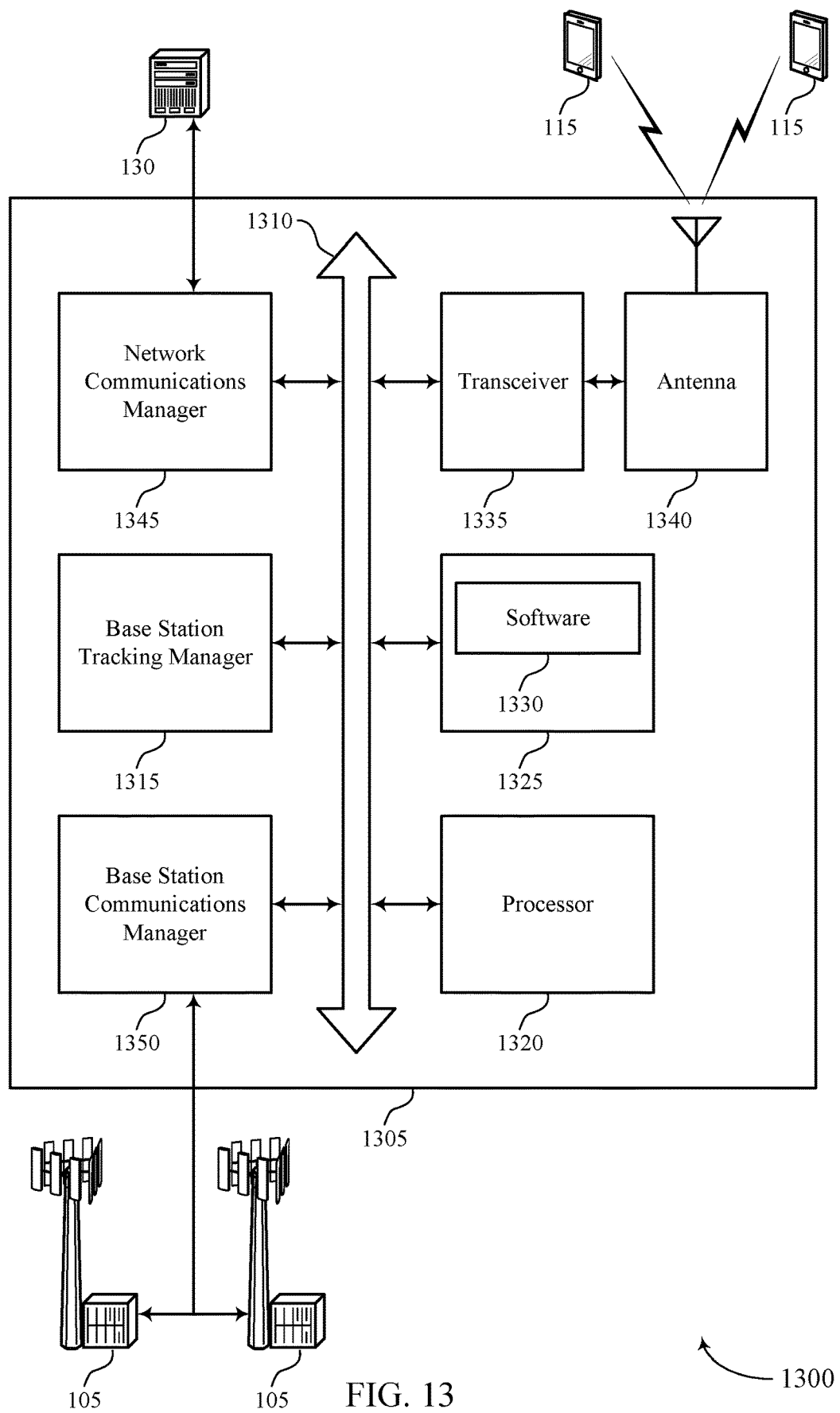
FIG. 13 illustrates a block diagram of a system including a base station that supports TRS for NR in accordance with aspects of the present disclosure.

FIG. 13 shows a diagram of a system 1300 including a device 1305 that supports TRS for NR in accordance with various aspects of the present disclosure. Device 1305 may be an example of or include the components of base station 105 as described above, e.g., with reference to FIG. 1. Device 1305 may include components for bi-directional voice and data communications including components for transmitting and receiving communications, including base station tracking manager 1315, processor 1320, memory 1325, software 1330, transceiver 1335, antenna 1340, network communications manager 1345, and base station communications manager 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting TRS for NR).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support TRS for NR. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Base station communications manager 1350 may manage communications with other base station 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide an X2 interface within an LTE/LTE-A wireless communication network technology to provide communication between base stations 105.

Figure 14:
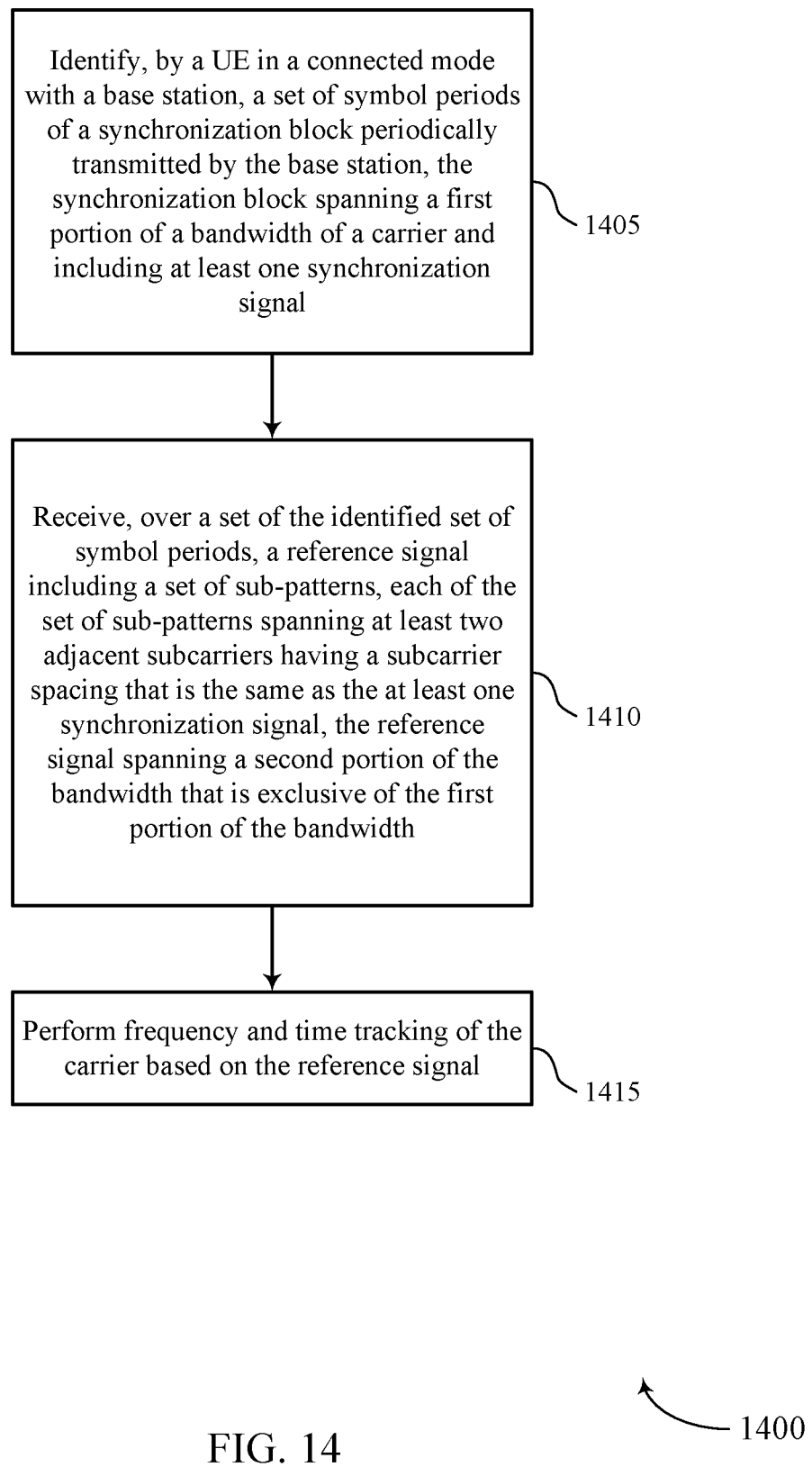
FIGS. 14 through 21 illustrate methods for TRS for NR in accordance with aspects of the present disclosure.

FIG. 14 shows a flowchart illustrating a method 1400 for TRS for NR in accordance with various aspects of the present disclosure. The operations of method 1400 may be implemented by a UE 115 or its components as described herein. For example, the operations of method 1400 may be performed by a UE tracking manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may identify, by a UE in a connected mode with a base station, a set of symbol periods of a synchronization block periodically transmitted by the base station, the synchronization block spanning a first portion of a bandwidth of a carrier and comprising at least one synchronization signal. The operations of 1405 may be performed according to the methods described with reference to FIGS. 1 through 5. In certain examples, aspects of the operations of 1405 may be performed by a symbol period component as described with reference to FIGS. 6 through 9.

At 1410 the UE 115 may receive, over a plurality of the identified set of symbol periods, a reference signal comprising a plurality of sub-patterns, each of the plurality of sub-patterns spanning at least two adjacent subcarriers having a subcarrier spacing that is the same as the at least one synchronization signal, the reference signal spanning a second portion of the bandwidth that is exclusive of the first portion of the bandwidth. The operations of 1410 may be performed according to the methods described with reference to FIGS. 1 through 5. In certain examples, aspects of the operations of 1410 may be performed by a reference signal component as described with reference to FIGS. 6 through 9.

At 1415 the UE 115 may perform frequency and time tracking of the carrier based on the reference signal. The operations of 1415 may be performed according to the methods described with reference to FIGS. 1 through 5. In certain examples, aspects of the operations of 1415 may be performed by a tracking component as described with reference to FIGS. 6 through 9.

Figure 15:
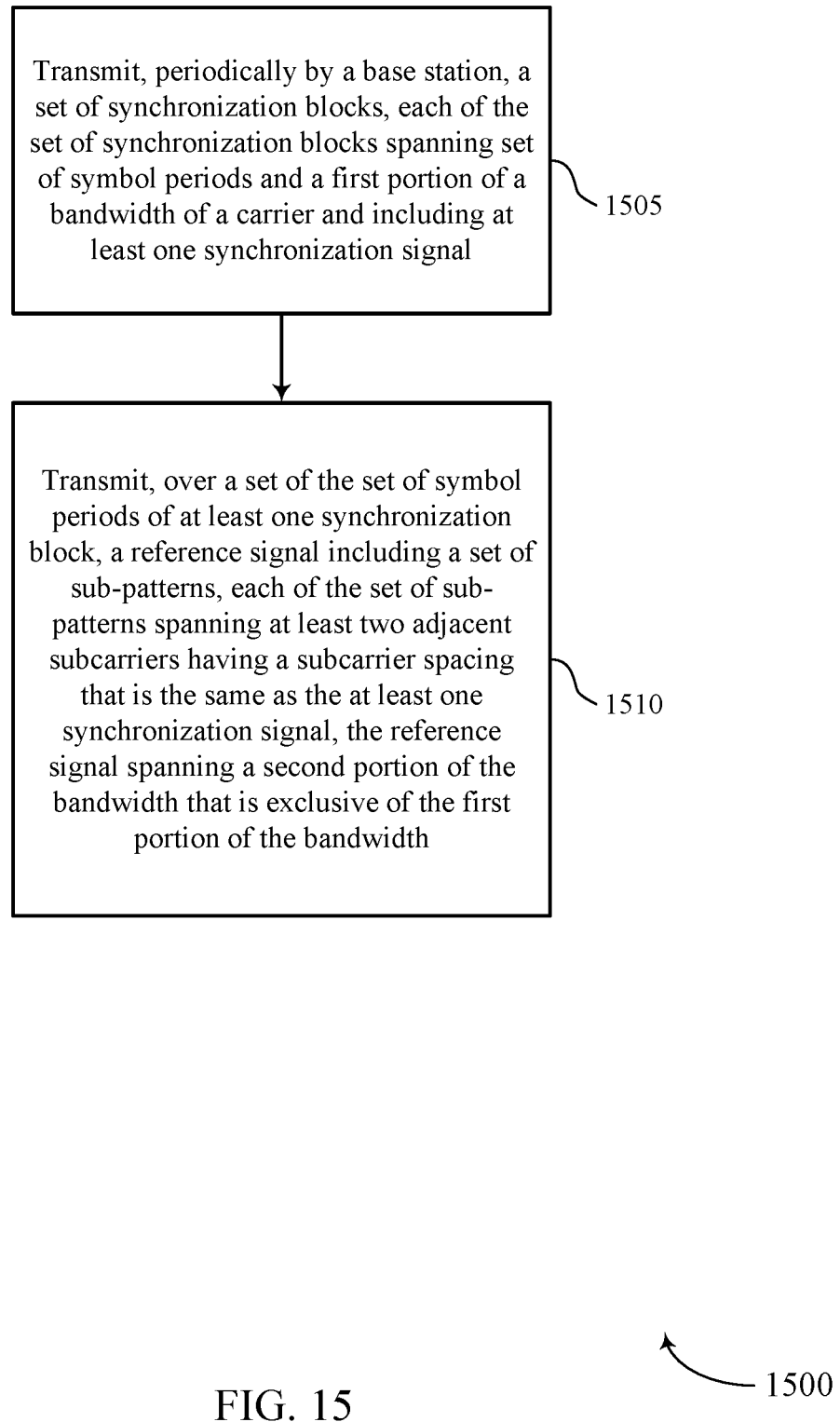

FIG. 15 shows a flowchart illustrating a method 1500 for TRS for NR in accordance with various aspects of the present disclosure. The operations of method 1500 may be implemented by a base station 105 or its components as described herein. For example, the operations of method 1500 may be performed by a base station tracking manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may transmit, periodically by a base station, a plurality of synchronization blocks, each of the plurality of synchronization blocks spanning set of symbol periods and a first portion of a bandwidth of a carrier and comprising at least one synchronization signal. The operations of 1505 may be performed according to the methods described with reference to FIGS. 1 through 5. In certain examples, aspects of the operations of 1505 may be performed by a synchronization component as described with reference to FIGS. 10 through 13.

At 1510 the base station 105 may transmit, over a plurality of the set of symbol periods of at least one synchronization block, a reference signal comprising a plurality of sub-patterns, each of the plurality of sub-patterns spanning at least two adjacent subcarriers having a subcarrier spacing that is the same as the at least one synchronization signal, the reference signal spanning a second portion of the bandwidth that is exclusive of the first portion of the bandwidth. The operations of 1510 may be performed according to the methods described with reference to FIGS. 1 through 5. In certain examples, aspects of the operations of 1510 may be performed by a reference signal transmitter as described with reference to FIGS. 10 through 13.

Figure 16:
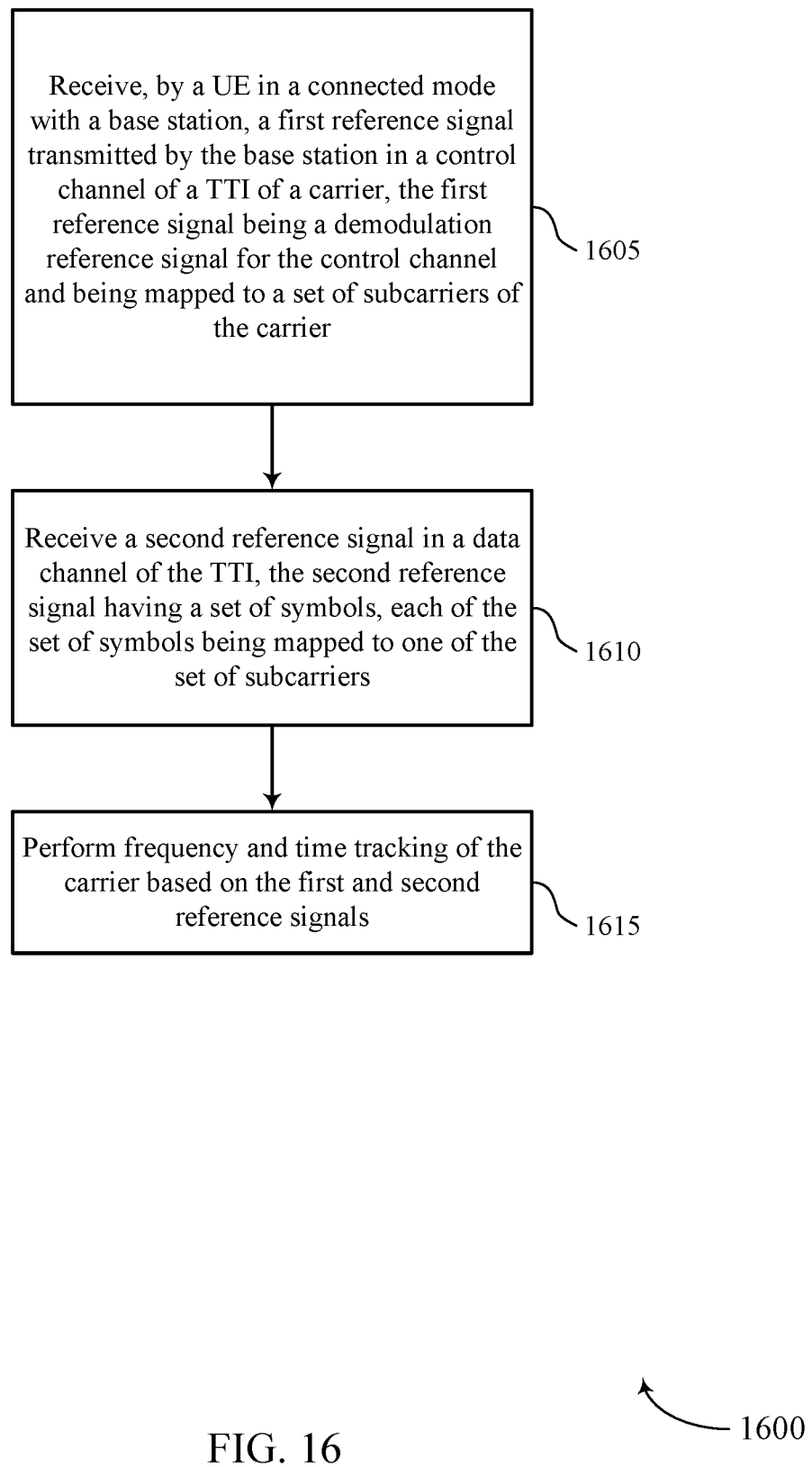

FIG. 16 shows a flowchart illustrating a method 1600 for TRS for NR in accordance with various aspects of the present disclosure. The operations of method 1600 may be implemented by a UE 115 or its components as described herein. For example, the operations of method 1600 may be performed by a UE tracking manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive, by a UE in a connected mode with a base station, a first reference signal transmitted by the base station in a control channel of a TTI of a carrier, the first reference signal being a demodulation reference signal for the control channel and being mapped to a set of subcarriers of the carrier. The operations of 1605 may be performed according to the methods described with reference to FIGS. 1 through 5. In certain examples, aspects of the operations of 1605 may be performed by a reference signal component as described with reference to FIGS. 6 through 9.

At 1610 the UE 115 may receive a second reference signal in a data channel of the TTI, the second reference signal having a plurality of symbols, each of the plurality of symbols being mapped to a corresponding one of the set of subcarriers. The operations of 1610 may be performed according to the methods described with reference to FIGS. 1 through 5. In certain examples, aspects of the operations of 1610 may be performed by a reference signal component as described with reference to FIGS. 6 through 9.

At 1615 the UE 115 may perform frequency and time tracking of the carrier based on the first and second reference signals. The operations of 1615 may be performed according to the methods described with reference to FIGS. 1 through 5. In certain examples, aspects of the operations of 1615 may be performed by a tracking component as described with reference to FIGS. 6 through 9.

Figure 17:
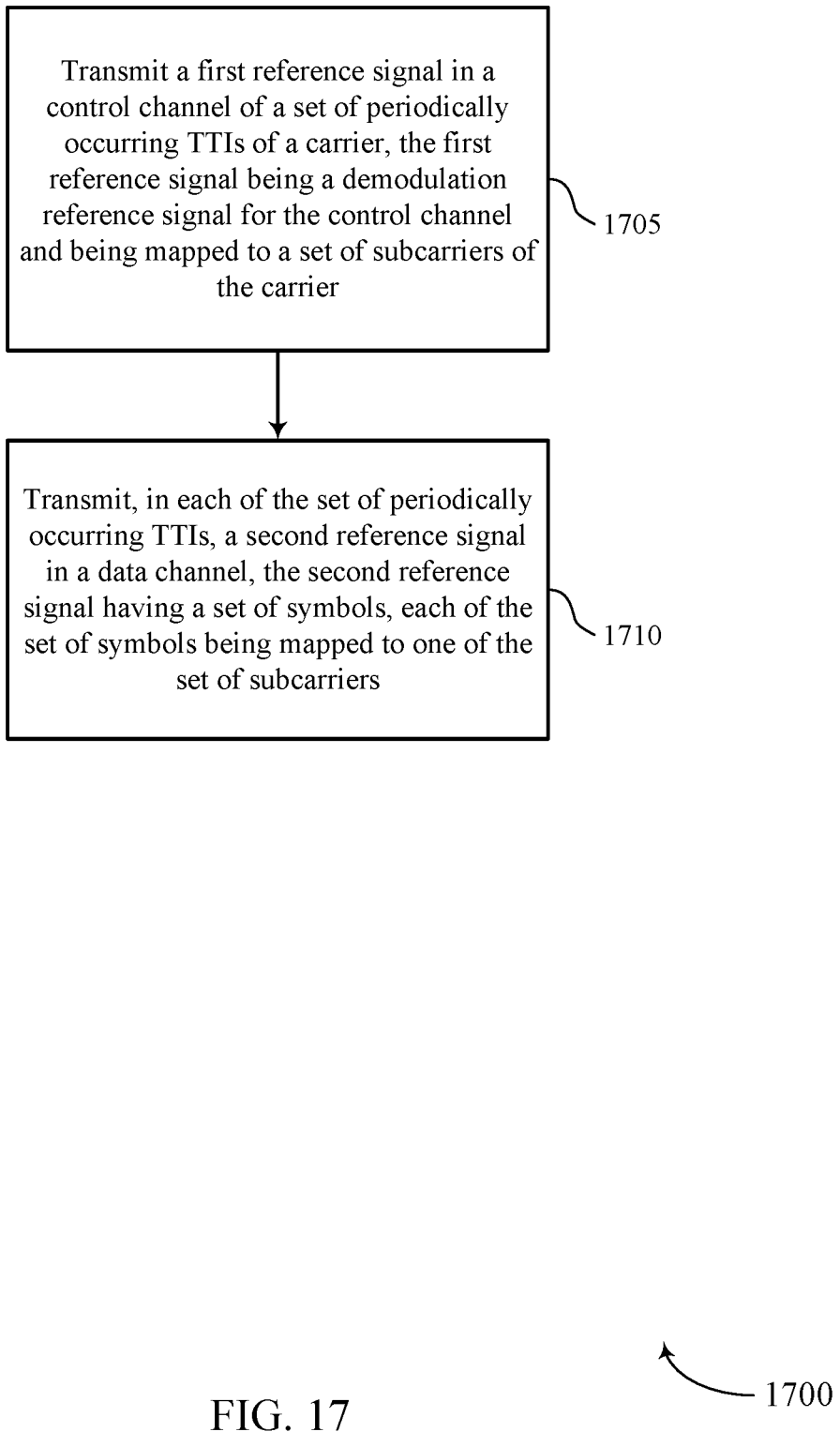

FIG. 17 shows a flowchart illustrating a method 1700 for TRS for NR in accordance with various aspects of the present disclosure. The operations of method 1700 may be implemented by a base station 105 or its components as described herein. For example, the operations of method 1700 may be performed by a base station tracking manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may transmit a first reference signal in a control channel of a plurality of periodically occurring TTIs of a carrier, the first reference signal being a demodulation reference signal for the control channel and being mapped to a set of subcarriers of the carrier. The operations of 1705 may be performed according to the methods described with reference to FIGS. 1 through 5. In certain examples, aspects of the operations of 1705 may be performed by a reference signal transmitter as described with reference to FIGS. 10 through 13.

At 1710 the base station 105 may transmit, in each of the plurality of periodically occurring TTIs, a second reference signal in a data channel, the second reference signal having a plurality of symbols, each of the plurality of symbols being mapped to a corresponding one of the set of subcarriers. The operations of 1710 may be performed according to the methods described with reference to FIGS. 1 through 5. In certain examples, aspects of the operations of 1710 may be performed by a reference signal transmitter as described with reference to FIGS. 10 through 13.

Figure 18:
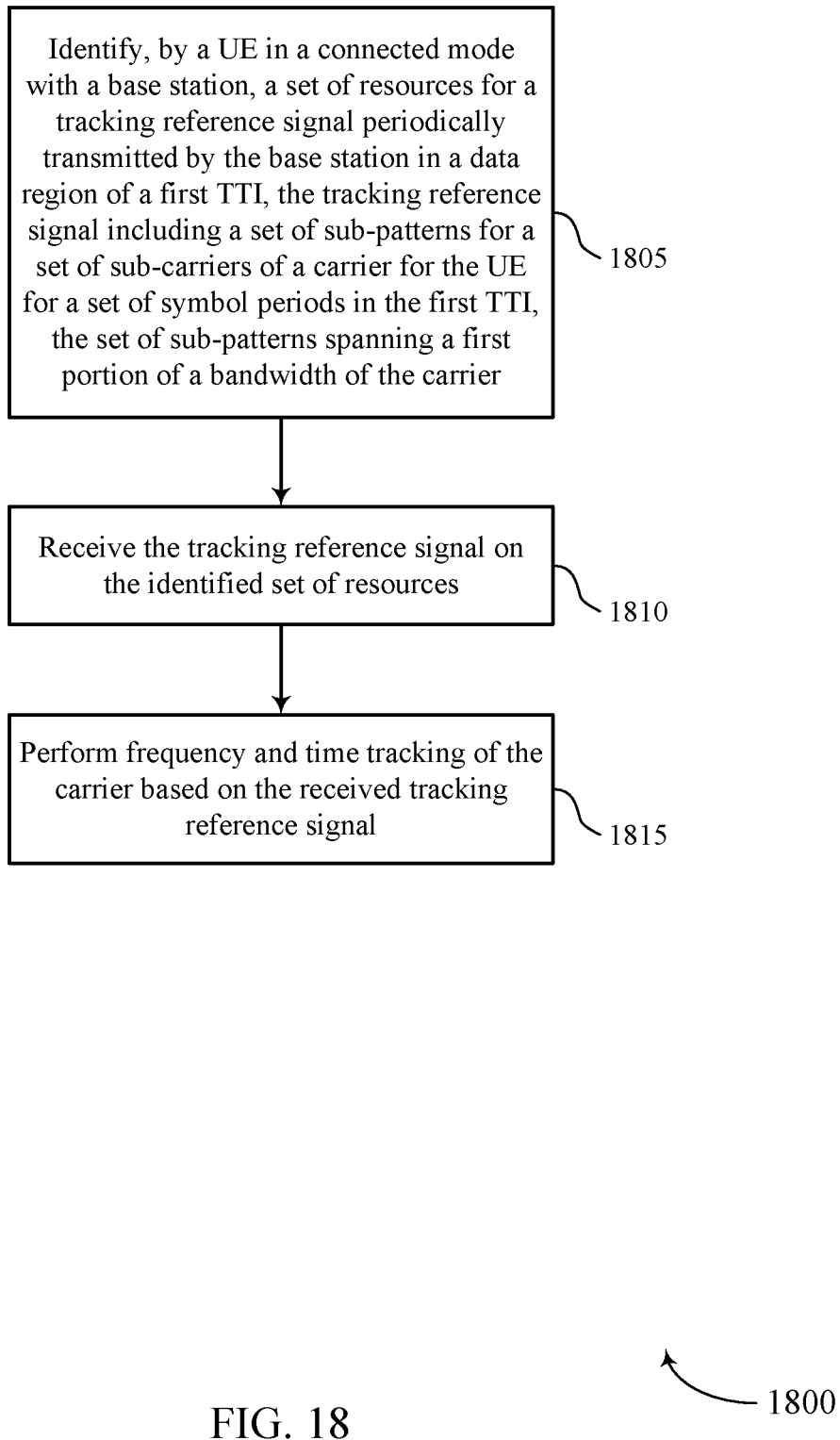

FIG. 18 shows a flowchart illustrating a method 1800 for TRS for NR in accordance with various aspects of the present disclosure. The operations of method 1800 may be implemented by a UE 115 or its components as described herein. For example, the operations of method 1800 may be performed by a UE tracking manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may identify, by a UE in a connected mode with a base station, a set of resources for a TRS periodically transmitted by the base station in a data region of a first TTI, the TRS comprising a plurality of sub-patterns for a set of sub-carriers of a carrier for the UE for a set of symbol periods in the first TTI, the plurality of sub-patterns spanning a first portion of a bandwidth of the carrier. The operations of 1805 may be performed according to the methods described herein. In certain examples, aspects of the operations of 1805 may be performed by a symbol period component as described with reference to FIGS. 6 through 9.

At 1810 the UE 115 may receive the TRS on the identified set of resources. The operations of 1810 may be performed according to the methods described herein. In certain examples, aspects of the operations of 1810 may be performed by a reference signal component as described with reference to FIGS. 6 through 9.

At 1815 the UE 115 may perform frequency and time tracking of the carrier based on the received TRS. The operations of 1815 may be performed according to the methods described herein. In certain examples, aspects of the operations of 1815 may be performed by a tracking component as described with reference to FIGS. 6 through 9.

Figure 19:
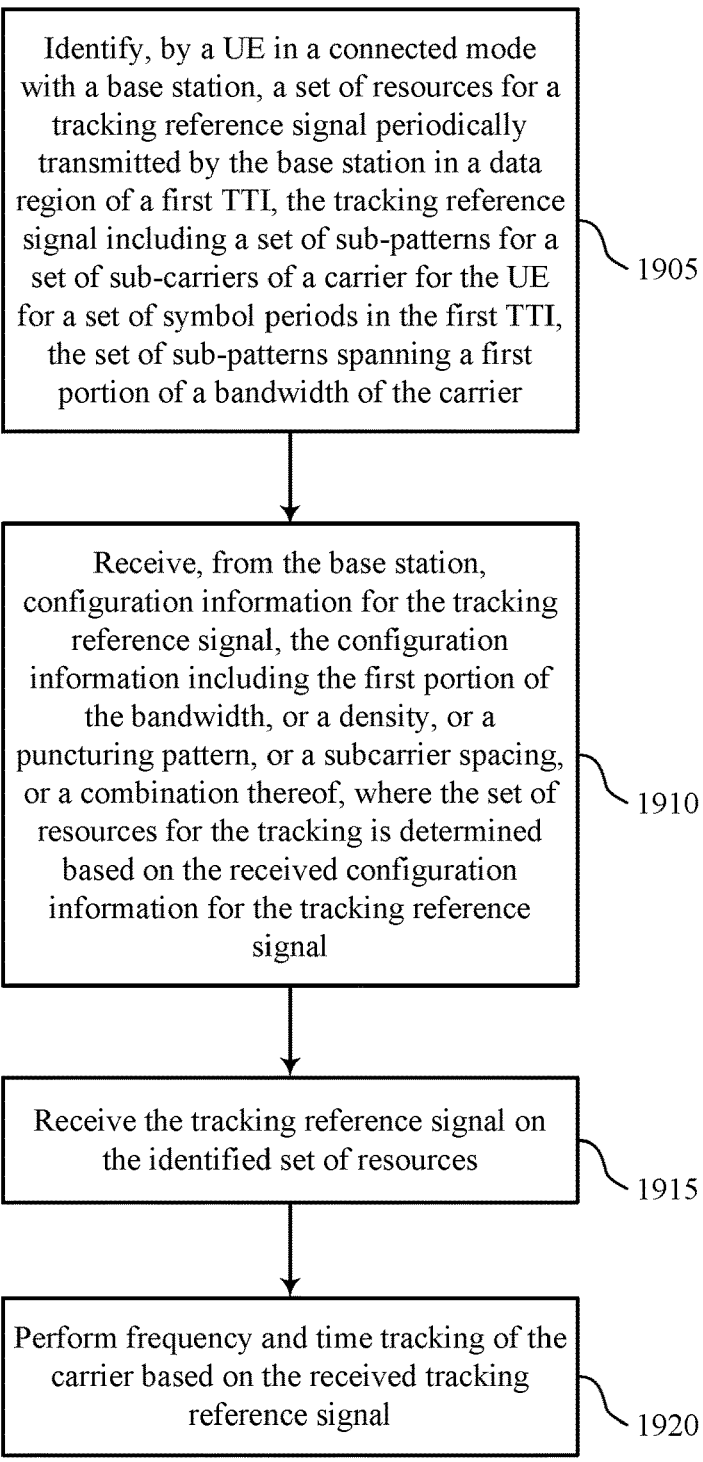

FIG. 19 shows a flowchart illustrating a method 1900 for TRS for NR in accordance with various aspects of the present disclosure. The operations of method 1900 may be implemented by a UE 115 or its components as described herein. For example, the operations of method 1900 may be performed by a UE tracking manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may identify, by a UE in a connected mode with a base station, a set of resources for a TRS periodically transmitted by the base station in a data region of a first TTI, the TRS comprising a plurality of sub-patterns for a set of sub-carriers of a carrier for the UE for a set of symbol periods in the first TTI, the plurality of sub-patterns spanning a first portion of a bandwidth of the carrier. The operations of 1905 may be performed according to the methods described herein. In certain examples, aspects of the operations of 1905 may be performed by a symbol period component as described with reference to FIGS. 6 through 9.

At 1910 the UE 115 may receive, from the base station, configuration information for the TRS, the configuration information comprising the first portion of the bandwidth, or a density, or a puncturing pattern, or a subcarrier spacing, or a combination thereof, where the set of resources for the tracking is determined based on the received configuration information for the TRS. The operations of 1910 may be performed according to the methods described herein. In certain examples, aspects of the operations of 1910 may be performed by a reference signal component as described with reference to FIGS. 6 through 9.

At 1915 the UE 115 may receive the TRS on the identified set of resources. The operations of 1915 may be performed according to the methods described herein. In certain examples, aspects of the operations of 1915 may be performed by a reference signal component as described with reference to FIGS. 6 through 9.

At 1920 the UE 115 may perform frequency and time tracking of the carrier based on the received TRS. The operations of 1920 may be performed according to the methods described herein. In certain examples, aspects of the operations of 1920 may be performed by a tracking component as described with reference to FIGS. 6 through 9.

Figure 20:
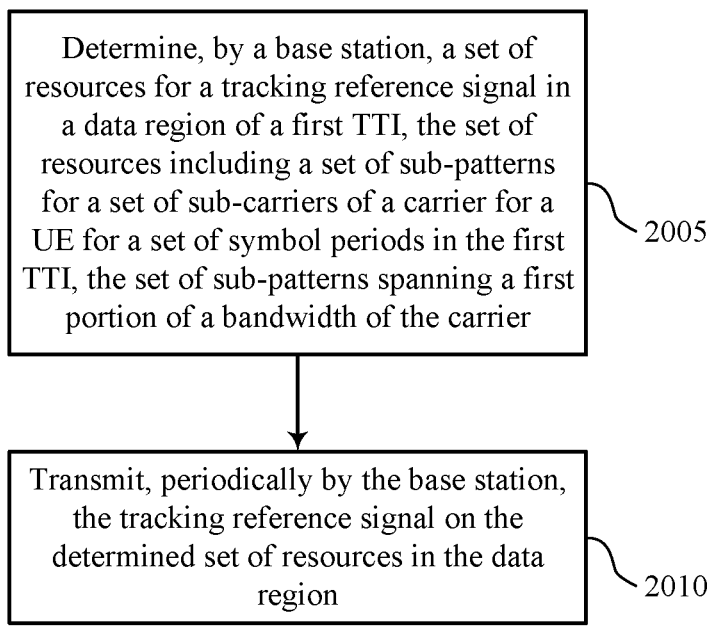

FIG. 20 shows a flowchart illustrating a method 2000 for TRS for NR in accordance with various aspects of the present disclosure. The operations of method 2000 may be implemented by a base station 105 or its components as described herein. For example, the operations of method 2000 may be performed by a base station tracking manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 2005 the base station 105 may determine, by a base station, a set of resources for a TRS in a data region of a first TTI, the set of resources comprising a plurality of sub-patterns for a set of sub-carriers of a carrier for a UE for a set of symbol periods in the first TTI, the plurality of sub-patterns spanning a first portion of a bandwidth of the carrier. The operations of 2005 may be performed according to the methods described herein. In certain examples, aspects of the operations of 2005 may be performed by a synchronization component as described with reference to FIGS. 10 through 13.

At 2010 the base station 105 may transmit, periodically by the base station, the TRS on the determined set of resources in the data region. The operations of 2010 may be performed according to the methods described herein. In certain examples, aspects of the operations of 2010 may be performed by a reference signal transmitter as described with reference to FIGS. 10 through 13.

Figure 21:
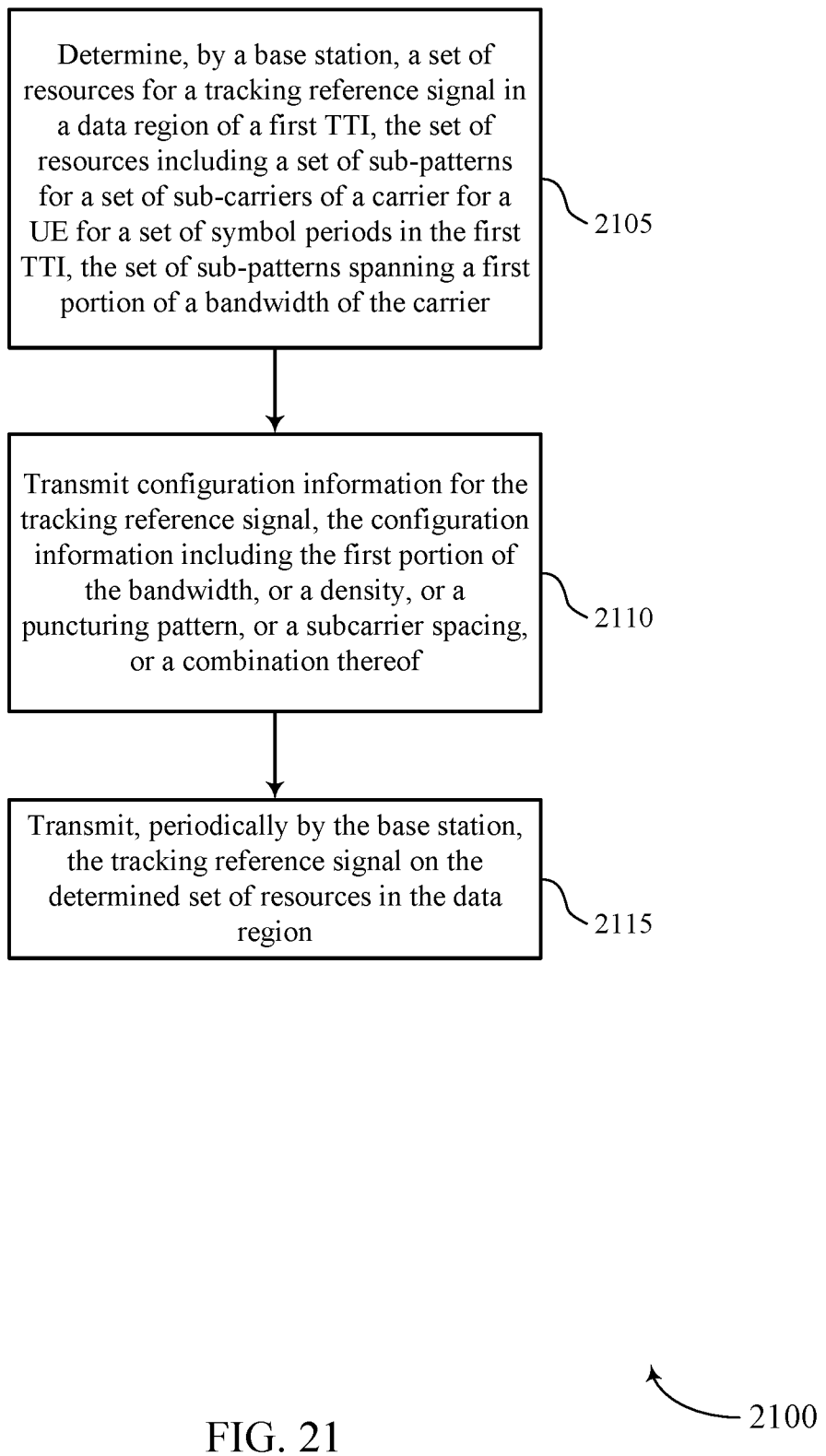

FIG. 21 shows a flowchart illustrating a method 2100 for TRS for NR in accordance with various aspects of the present disclosure. The operations of method 2100 may be implemented by a base station 105 or its components as described herein. For example, the operations of method 2100 may be performed by a base station tracking manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 2105 the base station 105 may determine, by a base station, a set of resources for a TRS in a data region of a first TTI, the set of resources comprising a plurality of sub-patterns for a set of sub-carriers of a carrier for a UE for a set of symbol periods in the first TTI, the plurality of sub-patterns spanning a first portion of a bandwidth of the carrier. The operations of 2105 may be performed according to the methods described herein. In certain examples, aspects of the operations of 2105 may be performed by a synchronization component as described with reference to FIGS. 10 through 13.

At 2110 the base station 105 may transmit configuration information for the TRS, the configuration information comprising the first portion of the bandwidth, or a density, or a puncturing pattern, or a subcarrier spacing, or a combination thereof. The operations of 2110 may be performed according to the methods described herein. In certain examples, aspects of the operations of 2110 may be performed by a reference signal transmitter as described with reference to FIGS. 10 through 13.

At 2115 the base station 105 may transmit, periodically by the base station, the TRS on the determined set of resources in the data region. The operations of 2115 may be performed according to the methods described herein. In certain examples, aspects of the operations of 2115 may be performed by a reference signal transmitter as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying, by a user equipment (UE) in a connected mode with a base station, a set of resources for a tracking reference signal periodically received from the base station in a data region of a first transmission time interval (TTI), the tracking reference signal comprising a plurality of sub-patterns for a set of sub-carriers of a carrier for the UE for a set of symbol periods in the first TTI, the plurality of sub-patterns spanning a first portion of a bandwidth of the carrier;
receiving the tracking reference signal on the identified set of resources from the base station; and
performing frequency and time tracking of the carrier based at least in part on the received tracking reference signal.

2. The method of claim 1, further comprising:
receiving, from the base station, configuration information for the tracking reference signal, the configuration information comprising the first portion of the bandwidth, or a density, or a puncturing pattern, or a sub-carrier spacing, or a combination thereof, wherein the set of resources for the tracking is determined based at least in part on the received configuration information for the tracking reference signal.

3. The method of claim 1, wherein the plurality of sub-patterns comprise paired symbol periods transmitted on a same sub-carrier.

4. The method of claim 1, wherein the first TTI comprises a downlink TTI.

5. The method of claim 1, wherein the plurality of sub-patterns for the set of sub-carriers spans the bandwidth of the carrier.

6. The method of claim 1, wherein the plurality of sub-patterns are separated by at least one sub-carrier within the first portion of the bandwidth.

7. The method of claim 1, wherein the tracking reference signal extends across an entirety of the bandwidth of the carrier.

8. The method of claim 1, further comprising:
identifying a plurality of TTIs to receive a supplemental tracking reference signal from the base station based at least in part on a timing of a transition of the UE from an idle mode to the connected mode, or a timing of a connected mode discontinuous reception (CDRX) cycle for the UE, or receiving an indicator of at least one of the plurality of TTIs.

9. The method of claim 1, further comprising:
receiving a supplemental tracking reference signal over a plurality of TTIs from the base station, the supplemental tracking reference signal comprising a same plurality of sub-patterns as the plurality of sub-patterns of the tracking reference signal periodically received from the base station.

10. The method of claim 1, further comprising:
receiving a supplemental tracking reference signal over a second TTI from the base station, the supplemental tracking reference signal comprising a second plurality of sub-patterns for a second set of sub-carriers, the second plurality of sub-patterns spanning at least a portion of the bandwidth of the carrier, and at least one of the second plurality of sub-patterns different from the plurality of sub-patterns of the tracking reference signal periodically received from the base station.

11. The method of claim 10, wherein a density of the supplemental tracking reference signal in the second TTI is greater than the density of the tracking reference signal in the first TTI.

12. The method of claim 1, further comprising:
identifying a second set of resources for the tracking reference signal periodically received from the base station in a data region of a second TTI, the second set of resources comprising the plurality of sub-patterns for the set of sub-carriers in the second TTI; and
receiving the tracking reference signal on the identified second set of resources from the base station;
wherein the frequency and time tracking of the carrier is based at least in part on the received tracking reference signal in the first TTI and the received tracking reference signal in the second TTI.

13. The method of claim 1, further comprising:
receiving the tracking reference signal over a plurality of TTIs from the base station; and
performing the frequency and time tracking of the carrier based at least in part on identifying that a tracking loop for the tracking reference signal received over the plurality of TTIs has converged.

14. The method of claim 1, further comprising:
identifying a synchronization block periodically received from the base station, the synchronization block spanning a second portion of the bandwidth of the carrier in the first TTI, wherein the second portion of the bandwidth is exclusive of the first portion of the bandwidth; and
receiving a plurality of synchronization signals of the synchronization block in the identified set of symbol periods of the first TTI from the base station.

15. The method of claim 14, wherein the synchronization block is transmitted in at least the set of symbol periods for the tracking reference signal.

16. The method of claim 1, further comprising:
receiving a demodulation reference signal in a control region of the first TTI from the base station, the demodulation reference signal mapped to the set of sub-carriers of the first TTI; and
identifying the set of sub-carriers for the tracking reference signal based at least in part on the set of sub-carriers for the received demodulation reference signal.

17. A method for wireless communication, comprising:
  determining, by a base station, a set of resources for a tracking reference signal in a data region of a first transmission time interval (TTI), the set of resources comprising a plurality of sub-patterns for a set of sub-carriers of a carrier for a user equipment (UE) for a set of symbol periods in the first TTI, the plurality of sub-patterns spanning a first portion of a bandwidth of the carrier; and
  transmitting, periodically by the base station, the tracking reference signal on the determined set of resources in the data region to the UE.

18. The method of claim 17, further comprising:
  transmitting configuration information for the tracking reference signal, the configuration information comprising the first portion of the bandwidth, or a density, or a puncturing pattern, or a sub-carrier spacing, or a combination thereof.

19. The method of claim 17, wherein the plurality of sub-patterns comprise paired symbol periods transmitted on a same sub-carrier.

20. The method of claim 17, wherein the first TTI comprises a downlink TTI.

21. The method of claim 17, wherein the plurality of sub-patterns for the set of sub-carriers spans the bandwidth of the carrier.

22. The method of claim 17, wherein the plurality of sub-patterns are separated by at least one sub-carrier within the first portion of the bandwidth.

23. The method of claim 17, wherein transmitting the tracking reference signal further comprises:
  transmitting the tracking reference signal based at least in part on determining that the UE is in a connected mode.

24. The method of claim 23, further comprising:
  determining that the UE has transitioned from the connected mode with the base station to an idle mode; and
  suppressing transmission of the tracking reference signal for at least one subsequent TTI based on the determining.

25. The method of claim 17, wherein transmitting the tracking reference signal comprises:
  determining an absence of UEs in a connected mode with the base station; and
  suppressing transmission of the tracking reference signal based at least in part on the determining.

26. The method of claim 17, further comprising:
  transmitting a supplemental tracking reference signal over a plurality of TTIs, the supplemental tracking reference signal comprising a same plurality of sub-patterns as the plurality of sub-patterns of the tracking reference signal periodically transmitted by the base station.

27. The method of claim 17, further comprising:
  transmitting a supplemental tracking reference signal over a second TTI, the supplemental tracking reference signal comprising a second plurality of sub-patterns for a second set of sub-carriers, the second plurality of sub-patterns spanning at least a portion of the bandwidth of the carrier, and at least one of the second plurality of sub-patterns different from the plurality of sub-patterns of the tracking reference signal periodically transmitted by the base station.

28. The method of claim 27, wherein a density of the supplemental tracking reference signal in the second TTI is greater than the density of the tracking reference signal in the first TTI.

29. The method of claim 17, further comprising:
  determining a second set of resources for the tracking reference signal in a data region of a second TTI, the second set of resources comprising the plurality of sub-patterns for the set of sub-carriers in the second TTI; and
  transmitting, periodically by the base station, the tracking reference signal on the determined second set of resources.

30. The method of claim 17, further comprising:
  transmitting, periodically by the base station, a synchronization block over a second portion of the bandwidth of the carrier in the first TTI, wherein the second portion of the bandwidth is exclusive of the first portion of the bandwidth; and
  transmitting a plurality of synchronization signals of the synchronization block in the set of symbol periods of the first TTI.

31. The method of claim 30, wherein the synchronization block is transmitted in at least the set of symbol periods for the tracking reference signal.

32. The method of claim 17, further comprising:
  transmitting a demodulation reference signal in a control region of the first TTI, the demodulation reference signal mapped to the set of sub-carriers of the first TTI; and
  allocating the set of sub-carriers for the tracking reference signal based at least in part on the set of sub-carriers for the transmitted demodulation reference signal.

33. An apparatus for wireless communication, comprising:
  a processor;
  memory in electronic communication with the processor; and
  instructions stored in the memory and executable by the processor to cause the apparatus to:
  identify, by a user equipment (UE) in a connected mode with a base station, a set of resources for a tracking reference signal periodically received from the base station in a data region of a first transmission time interval (TTI), the tracking reference signal comprising a plurality of sub-patterns for a set of sub-carriers of a carrier for the UE for a set of symbol periods in the first TTI, the plurality of sub-patterns spanning a first portion of a bandwidth of the carrier;
  receive the tracking reference signal on the identified set of resources from the base station; and
  perform frequency and time tracking of the carrier based at least in part on the received tracking reference signal.

34. The apparatus of claim 33, wherein the instructions are further executable by the processor to cause the apparatus to:
  receive, from the base station, configuration information for the tracking reference signal, the configuration information comprising the first portion of the bandwidth, or a density, or a puncturing pattern, or a subcarrier spacing, or a combination thereof, wherein the set of resources for the tracking is determined based at least in part on the received configuration information for the tracking reference signal.

35. The apparatus of claim 33, wherein the plurality of sub-patterns comprise paired symbol periods transmitted on a same sub-carrier.

36. The apparatus of claim 33, wherein the plurality of sub-patterns for the set of sub-carriers spans the bandwidth of the carrier.

37. The apparatus of claim 33, wherein the plurality of sub-patterns are separated by at least one sub-carrier within the first portion of the bandwidth.

38. The apparatus of claim 33, wherein the tracking reference signal extends across an entirety of the bandwidth of the carrier.

39. An apparatus for wireless communication, comprising:
a processor;
memory in electronic communication with the processor; and
instructions stored in the memory and executable by the processor to cause the apparatus to:
determine, by a base station, a set of resources for a tracking reference signal in a data region of a first transmission time interval (TTI), the set of resources comprising a plurality of sub-patterns for a set of sub-carriers of a carrier for a user equipment (UE) for a set of symbol periods in the first TTI, the plurality of sub-patterns spanning a first portion of a bandwidth of the carrier; and
transmit, periodically by the base station, the tracking reference signal on the determined set of resources in the data region to the UE.

40. The apparatus of claim 39, wherein the instructions are further executable by the processor to cause the apparatus to:
transmit configuration information for the tracking reference signal, the configuration information comprising the first portion of the bandwidth, or a density, or a puncturing pattern, or a sub-carrier spacing, or a combination thereof.

41. The apparatus of claim 39, wherein the plurality of sub-patterns comprise paired symbol periods transmitted on a same sub-carrier.

42. The apparatus of claim 39, wherein the plurality of sub-patterns for the set of sub-carriers spans the bandwidth of the carrier.

43. The apparatus of claim 39, wherein the plurality of sub-patterns are separated by at least one sub-carrier within the first portion of the bandwidth.

44. The apparatus of claim 39, wherein the instructions to transmit the tracking reference signal further are executable by the processor to cause the apparatus to:
transmit the tracking reference signal based at least in part on determining that the UE is in a connected mode.

45. The apparatus of claim 44, wherein the instructions are further executable by the processor to cause the apparatus to:
determine that the UE has transitioned from the connected mode with the base station to an idle mode; and
suppress transmission of the tracking reference signal for at least one subsequent TTI based on the determining.

46. The apparatus of claim 39, wherein the instructions to transmit the tracking reference signal are executable by the processor to cause the apparatus to:
determine an absence of UEs in a connected mode with the base station; and
suppress transmission of the tracking reference signal based at least in part on the determining.

47. An apparatus for wireless communication, comprising:
means for identifying, by a user equipment (UE) in a connected mode with a base station, a set of resources for a tracking reference signal periodically received from the base station in a data region of a first transmission time interval (TTI), the tracking reference signal comprising a plurality of sub-patterns for a set of sub-carriers of a carrier for the UE for a set of symbol periods in the first TTI, the plurality of sub-patterns spanning a first portion of a bandwidth of the carrier;
means for receiving the tracking reference signal on the identified set of resources from the base station; and
means for performing frequency and time tracking of the carrier based at least in part on the received tracking reference signal.

48. An apparatus for wireless communication, comprising:
means for determining, by a base station, a set of resources for a tracking reference signal in a data region of a first transmission time interval (TTI), the set of resources comprising a plurality of sub-patterns for a set of sub-carriers of a carrier for a user equipment (UE) for a set of symbol periods in the first TTI, the plurality of sub-patterns spanning a first portion of a bandwidth of the carrier; and
means for transmitting, periodically by the base station, the tracking reference signal on the determined set of resources in the data region to the UE.

49. A non-transitory computer-readable medium storing code for wireless communication, the code comprising instructions executable by a processor to:
identify, by a user equipment (UE) in a connected mode with a base station, a set of resources for a tracking reference signal periodically received from the base station in a data region of a first transmission time interval (TTI), the tracking reference signal comprising a plurality of sub-patterns for a set of sub-carriers of a carrier for the UE for a set of symbol periods in the first TTI, the plurality of sub-patterns spanning a first portion of a bandwidth of the carrier;
receive the tracking reference signal on the identified set of resources from the base station; and
perform frequency and time tracking of the carrier based at least in part on the received tracking reference signal.

50. A non-transitory computer-readable medium storing code for wireless communication, the code comprising instructions executable by a processor to:
determine, by a base station, a set of resources for a tracking reference signal in a data region of a first transmission time interval (TTI), the set of resources comprising a plurality of sub-patterns for a set of sub-carriers of a carrier for a user equipment (UE) for a set of symbol periods in the first TTI, the plurality of sub-patterns spanning a first portion of a bandwidth of the carrier; and
transmit, periodically by the base station, the tracking reference signal on the determined set of resources in the data region to the UE.

* * * * *